(12) United States Patent
Kuroha et al.

(10) Patent No.: US 8,821,700 B2
(45) Date of Patent: *Sep. 2, 2014

(54) PHOTOELECTROCHEMICAL CELL AND ENERGY SYSTEM USING SAME

(75) Inventors: Tomohiro Kuroha, Osaka (JP); Takaiki Nomura, Osaka (JP); Kazuhito Hato, Osaka (JP); Noboru Taniguchi, Osaka (JP); Takahiro Suzuki, Osaka (JP); Kenichi Tokuhiro, Osaka (JP)

(73) Assignee: Panasonic Corporation, Osaka (JP)

( * ) Notice: Subject to any disclaimer, the term of this patent is extended or adjusted under 35 U.S.C. 154(b) by 130 days.

This patent is subject to a terminal disclaimer.

(21) Appl. No.: 13/502,322
(22) PCT Filed: Nov. 4, 2010
(86) PCT No.: PCT/JP2010/006498
§ 371 (c)(1), (2), (4) Date: Apr. 16, 2012
(87) PCT Pub. No.: WO2011/058723
PCT Pub. Date: May 19, 2011

(65) Prior Publication Data
US 2012/0276464 A1 Nov. 1, 2012

(30) Foreign Application Priority Data
Nov. 10, 2009 (JP) ................................. 2009-257437

(51) Int. Cl.
| | | |
|---|---|---|
| C25B 1/04 | (2006.01) | |
| C25B 5/00 | (2006.01) | |
| C25B 9/06 | (2006.01) | |
| C25B 1/00 | (2006.01) | |
| C01B 3/04 | (2006.01) | |
| H01M 8/06 | (2006.01) | |
| H01M 14/00 | (2006.01) | |

(52) U.S. Cl.
CPC ................ C25B 1/003 (2013.01); C01B 3/042 (2013.01); H01M 8/0606 (2013.01); H01M 14/005 (2013.01); *Y02E 60/364* (2013.01); *Y02E 60/50* (2013.01); *Y02E 60/366* (2013.01)
USPC ............................. 204/248; 205/340; 205/630

(58) Field of Classification Search
None
See application file for complete search history.

(56) References Cited

U.S. PATENT DOCUMENTS 4,061,555 A * 12/1977 Miyatani et al. .............. 204/242
4,090,933 A    5/1978 Nozik (Continued)

FOREIGN PATENT DOCUMENTS

| | | |
|---|---|---|
| CN | 1485003 | 3/2004 |
| JP | 51-123779 | 10/1976 |

(Continued)

OTHER PUBLICATIONS

Bard, Allen, Design of Semiconductor Photoelectrochemical Systems for Solar Energy Conversion, Journal of Physical Chemistry, 1982, vol. 86, pp. 172-177.*

(Continued)

*Primary Examiner* — Harry D Wilkins, III
(74) *Attorney, Agent, or Firm* — Hamre, Schumann, Mueller & Larson, P.C.

(57) ABSTRACT

A photoelectrochemical cell (100) includes: a semiconductor electrode (120) including a conductor (121), a first n-type semiconductor layer (122) having a nanotube array structure, and a second n-type semiconductor layer (123); a counter electrode (130) connected to the conductor (121); an electrolyte (140) in contact with the second n-type semiconductor layer (123) and the counter electrode (130); and a container (110) accommodating the semiconductor electrode (120), the counter electrode (130) and the electrolyte (140). Relative to a vacuum level, (I) band edge levels of a conduction band and a valence band in the second n-type semiconductor layer (123), respectively, are higher than band edge levels of a conduction band and a valence band in the first n-type semiconductor layer (122), (II) a Fermi level of the first n-type semiconductor layer (122) is higher than a Fermi level of the second n-type semiconductor layer (123), and (III) a Fermi level of the conductor (121) is higher than the Fermi level of the first n-type semiconductor layer (122).

11 Claims, 12 Drawing Sheets

(56) References Cited

U.S. PATENT DOCUMENTS

| | | | | |
|---|---|---|---|---|
| 4,181,754 | A | * | 1/1980 | McKinzie et al. ............ 427/74 |
| 4,203,814 | A | * | 5/1980 | Grantham .................... 205/340 |
| 4,251,289 | A | * | 2/1981 | Moustakas et al. .......... 136/255 |
| 4,310,405 | A | * | 1/1982 | Heller ......................... 204/252 |
| 4,461,691 | A | | 7/1984 | Frank |
| 4,466,869 | A | | 8/1984 | Ayers |
| 8,236,146 | B2 | * | 8/2012 | Nomura et al. .............. 204/248 |
| 2003/0025113 | A1 | * | 2/2003 | Van De Walle ............... 257/11 |
| 2004/0262154 | A1 | * | 12/2004 | Gibson et al. ................ 204/280 |
| 2007/0227896 | A1 | * | 10/2007 | McNulty et al. ............. 205/340 |
| 2007/0256729 | A1 | * | 11/2007 | Vijh et al. .................... 136/252 |
| 2007/0257595 | A1 | | 11/2007 | Hirose et al. |
| 2009/0127124 | A1 | * | 5/2009 | Guerra ......................... 205/340 |
| 2009/0183994 | A1 | * | 7/2009 | Misra et al. .................. 205/340 |
| 2010/0282601 | A1 | * | 11/2010 | Nomura et al. .............. 204/242 |

FOREIGN PATENT DOCUMENTS

| | | | |
|---|---|---|---|
| JP | 2002-143688 | | 5/2002 |
| JP | 2002-234105 | | 8/2002 |
| JP | 2003-154272 | | 5/2003 |
| JP | 2006-302695 A | * | 11/2006 |
| JP | 2007-214117 | | 8/2007 |
| JP | 2008-104899 | | 5/2008 |
| JP | 2009-507752 | | 2/2009 |
| JP | 2009-519204 | | 5/2009 |
| WO | 2007/120176 | | 10/2007 |
| WO | 2008/060293 | | 5/2008 |
| WO | WO 2010/050226 A1 | * | 5/2010 |

OTHER PUBLICATIONS

Gratzel, Michael, Photoelectrochemical cells, Nature, Nov. 2001, vol. 414, pp. 338-344.*

Zhao et al, Preparation and photoelectrochemical properties of Ti1-xVxO2 solid solution thin film photoelectrodes with gradient band gap, Thin Solid Films, No. 340, 1999, pp. 125-131.*

* cited by examiner

PHOTOELECTROCHEMICAL CELL AND ENERGY SYSTEM USING SAME

TECHNICAL FIELD

The present invention relates to a photoelectrochemical cell in which water is decomposed by irradiation with light and to an energy system using the photoelectrochemical cell.

BACKGROUND ART

There are conventionally known techniques, for example, in which water is decomposed for obtaining hydrogen and oxygen by irradiation of a semiconductor material that functions as a photocatalyst with light (see Patent Literature 1, for example), or in which a surface of a base material is rendered hydrophilic by covering the surface of the base material with the semiconductor material (see Patent Literature 2, for example).

Patent Literature 1 discloses a method in which an n-type semiconductor electrode and a counter electrode are disposed in an electrolyte and the surface of the n-type semiconductor electrode is irradiated with light, so that hydrogen and oxygen are obtained from the surfaces of both electrodes. Specifically, use of a $TiO_2$ electrode, a ZnO electrode, a CdS electrode and the like as the n-type semiconductor electrode is described therein.

Furthermore, Patent Literature 2 discloses a hydrophilic member formed of a base material and a coating layer formed on the surface of the base material, in which the coating layer has a titanium oxide layer that contains titanium oxide particles, and an island-shaped portion that is disposed on the titanium oxide layer and that is made of a second photocatalytic material other than titanium oxide. Specifically, use, as the second photocatalytic material, of a material having potentials at the bottom of a conduction band and the top of a valence band on a more positive side relative to the standard hydrogen electrode potential (negative side relative to the vacuum level) than the titanium oxide is described therein.

Moreover, there is proposed a photocatalytic thin film that brings about a highly efficient photocatalytic performance under natural light, in which at least one of metal ions such as Nb, V and Cr is injected into a photocatalytic thin film produced on a substrate to cause a change in the band gap or the potential gradient in the thickness direction of the photocatalytic thin film, thereby forming a gradient film (see Patent Literature 3).

Further, there also is proposed a technique for producing hydrogen by immersing, in a solution containing hydrogen sulfide, a multilayer thin film photocatalyst in which a first compound semiconductor layer and a second compound semiconductor layer that has a band gap different from the first compound semiconductor layer are disposed sequentially on an electrically conductive base material, and then irradiating this multilayer thin film photocatalyst with light (see Patent Literature 4).

CITATION LIST

Patent Literature

PTL 1: JP 51 (1976)-123779 A
PTL 2: JP 2002-234105 A
PTL 3: JP 2002-143688 A
PTL 4: JP 2003-154272 A

SUMMARY OF INVENTION

Technical Problem

However, the method described in Patent Literature 1 suffers from a problem of a low quantum efficiency for the water-splitting reaction by irradiation with light. This is because it is highly probable that holes and electrons generated by photoexcitation disappear due to recombination before being used for the electrolysis of water.

Patent Literature 2 describes that, among electrons and holes generated by photoexcitation, the electrons transfer to the conduction band of the second photocatalytic material and the holes transfer to the valence band of the titanium oxide, so that the electron-hole pairs are separated, which decreases the probability of the recombination. However, in Patent Literature 2, there is no description about the energy state to be set at the junction plane between the titanium oxide and the second photocatalytic material. When a Schottky barrier junction is formed at the junction plane between the titanium oxide and the second photocatalytic material, Schottky barriers occur at the junction plane in the conduction band and the valence band. At this time, among the electrons and holes generated by photoexcitation, the electrons are confined by the Schottky barrier in the conduction band at the junction plane, and the holes are accumulated around the junction plane of the valence band by the Schottky barrier that serves as a hole stopper in the valence band at the junction plane. Therefore, there has been a problem that the probability of recombination of electrons and holes is increased, compared to the case where the titanium oxide and the second photocatalytic material each are used independently.

In Patent Literature 3, metal ion doping is used for making a photocatalyst film into a gradient film. However, this configuration has been developed for the purpose of extending the utilized region to the visible light region and improving the light-use efficiency by making a photocatalyst film into a gradient film. Therefore, there is no description about the photocatalytic energy state to be set in the gradient film, and thus optimization of charge separation and the like is not performed.

A multilayer thin film photocatalyst described in Patent Literature 4 has a structure in which two semiconductors, CdS and ZnS, each having a band gap different from the other are joined, and the semiconductor ZnS further is joined to an electrically conductive base material Pt. Patent Literature 4 describes that since these materials with a different band gap are joined, electrons can transfer to the semiconductor ZnS, and further to the electrically conductive base material Pt along the gradient of the band gaps, and therefore can be coupled easily to hydrogen ions on the electrically conductive base material, which facilitates the generation of hydrogen (Paragraphs [0026] and [0027] in Patent Literature 4). However, focusing attention on the junction portions of materials in consideration of the Fermi level (vacuum reference level) of each of the materials, Schottky barriers occur in both the junction portion between CdS (−5.0 eV) and ZnS (−5.4 eV) and the junction portion between ZnS (−5.4 eV) and Pt (−5.7 eV) because the Fermi levels decrease in the transfer direction of the electrons (transfer direction from CdS to ZnS, further from ZnS to Pt). Accordingly, although this configuration can allow the electrons to transfer along the gradient of the band gaps, it hardly allows the electrons to transfer smoothly.

In view of such conventional problems, it is an object of the present invention to provide a photoelectrochemical cell capable of efficient charge separation between electrons and holes generated by photoexcitation and thus improving the quantum efficiency of the hydrogen evolution reaction by irradiation with light, and an energy system using the photoelectrochemical cell.

Solution to Problem

In order to achieve the object, the present invention provides a first photoelectrochemical cell including:

a semiconductor electrode including a conductor, a first n-type semiconductor layer that is disposed on the conductor and has a nanotube array structure, and a second n-type semiconductor layer disposed on the first n-type semiconductor layer;

a counter electrode connected electrically to the conductor;

an electrolyte in contact with surfaces of the second n-type semiconductor layer and the counter electrode; and a container accommodating the semiconductor electrode, the counter electrode and the electrolyte.

In the semiconductor electrode, relative to a vacuum level, (I) band edge levels of a conduction band and a valence band in the second n-type semiconductor layer, respectively, are higher than band edge levels of a conduction band and a valence band in the first n-type semiconductor layer, (II) a Fermi level of the first n-type semiconductor layer is higher than a Fermi level of the second n-type semiconductor layer, and (III) a Fermi level of the conductor is higher than the Fermi level of the first n-type semiconductor layer.

The first photoelectrochemical cell generates hydrogen by irradiation of the second n-type semiconductor layer with light.

Also, in order to achieve the object, the present invention provides a second photoelectrochemical cell including:

a semiconductor electrode including a conductor, a first p-type semiconductor layer that is disposed on the conductor and has a nanotube array structure, and a second p-type semiconductor layer disposed on the first p-type semiconductor layer;

a counter electrode connected electrically to the conductor;

an electrolyte in contact with surfaces of the second p-type semiconductor layer and the counter electrode; and a container accommodating the semiconductor electrode, the counter electrode and the electrolyte.

In the semiconductor electrode, relative to a vacuum level, (I) band edge levels of a conduction band and a valence band in the second p-type semiconductor layer, respectively, are lower than band edge levels of a conduction band and a valence band in the first p-type semiconductor layer, (II) a Fermi level of the first p-type semiconductor layer is lower than a Fermi level of the second p-type semiconductor layer, and (III) a Fermi level of the conductor is lower than the Fermi level of the first p-type semiconductor layer.

The second photoelectrochemical cell generates hydrogen by irradiation of the second p-type semiconductor layer with light.

An energy system according to the present invention includes:

the first or second photoelectrochemical cell according to the present invention;

a hydrogen storage that is connected to the first or second photoelectrochemical cell by a first pipe and that stores hydrogen generated in the first or second photoelectrochemical cell; and a fuel cell that is connected to the hydrogen storage by a second pipe and that converts the hydrogen stored in the hydrogen storage into electricity.

Advantageous Effects of Invention

The first and second photoelectrochemical cells according to the present invention allow efficient charge separation between electrons and holes generated by photoexcitation to be achieved, and the quantum efficiency of the hydrogen evolution reaction by irradiation with light to be improved. Since the energy system according to the present invention is provided with such a photoelectrochemical cell, efficient power supply is rendered possible.

DESCRIPTION OF EMBODIMENTS

Hereinafter, the embodiments of the present invention are described in detail with reference to the drawings. The embodiments described below are examples and the present invention is not limited to the following embodiments. Furthermore, in the following embodiments, the same members are indicated with identical numerals and the same descriptions thereof may be omitted.

(Embodiment 1)

Figure 1:
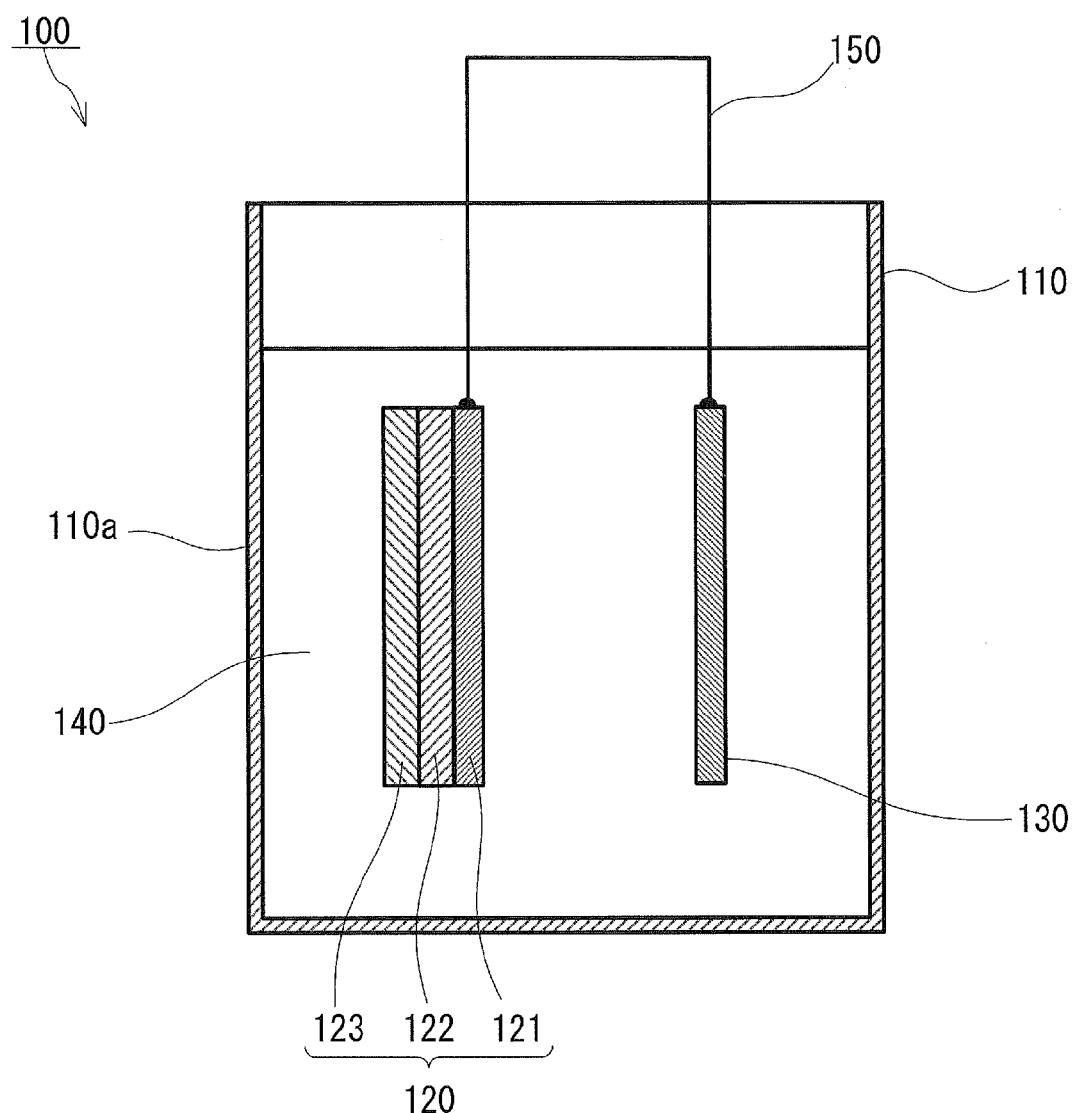
FIG. 1 is a schematic view illustrating the configuration of a photoelectrochemical cell according to Embodiment 1 of the present invention.
Figure 2:
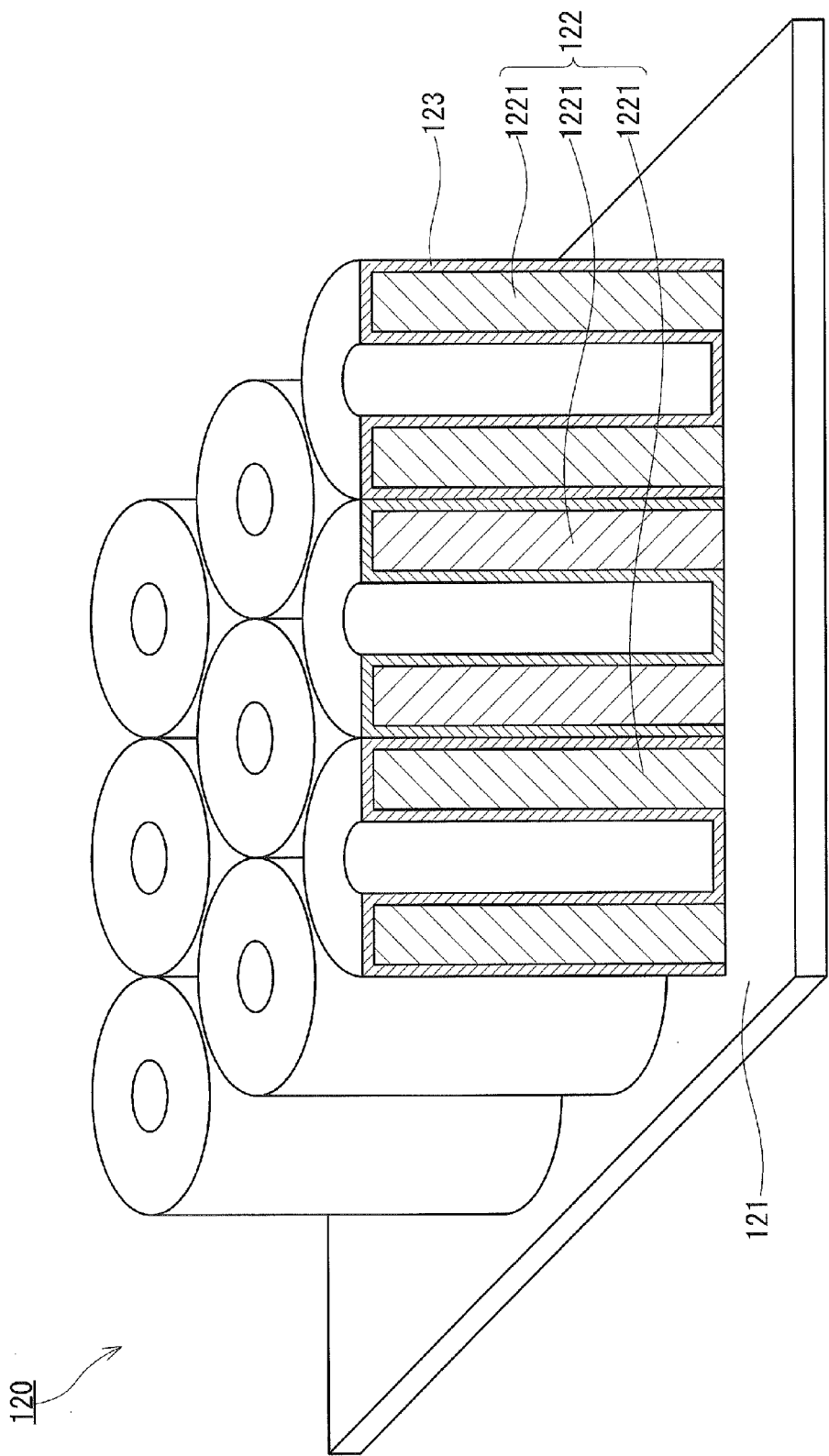
FIG. 2 is a conceptual diagram illustrating the configuration of a semiconductor electrode in the photoelectrochemical cell according to Embodiment 1 of the present invention, including a partial cross-sectional view.
Figure 3:
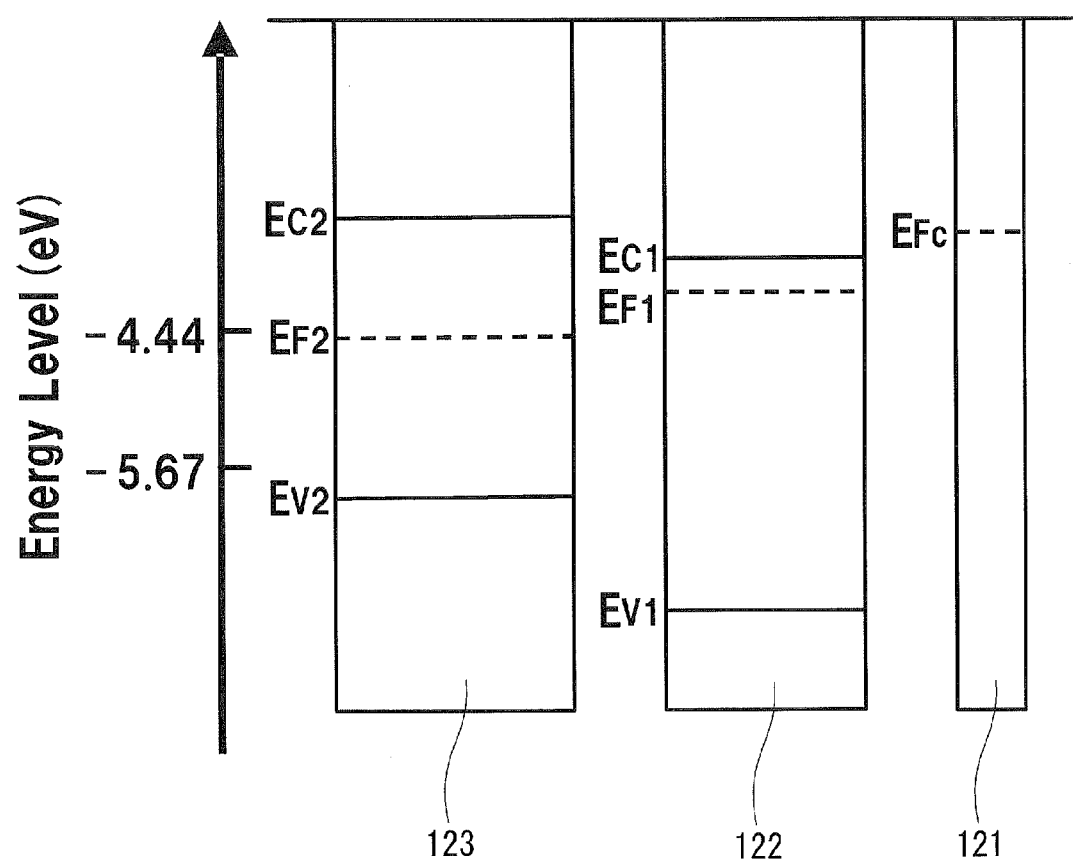
FIG. 3 is a conceptual diagram indicating a band structure of a conductor, a first n-type semiconductor layer and a second n-type semiconductor layer, before being joined, which constitute the semiconductor electrode in the photoelectrochemical cell according to Embodiment 1 of the present invention.
Figure 4:
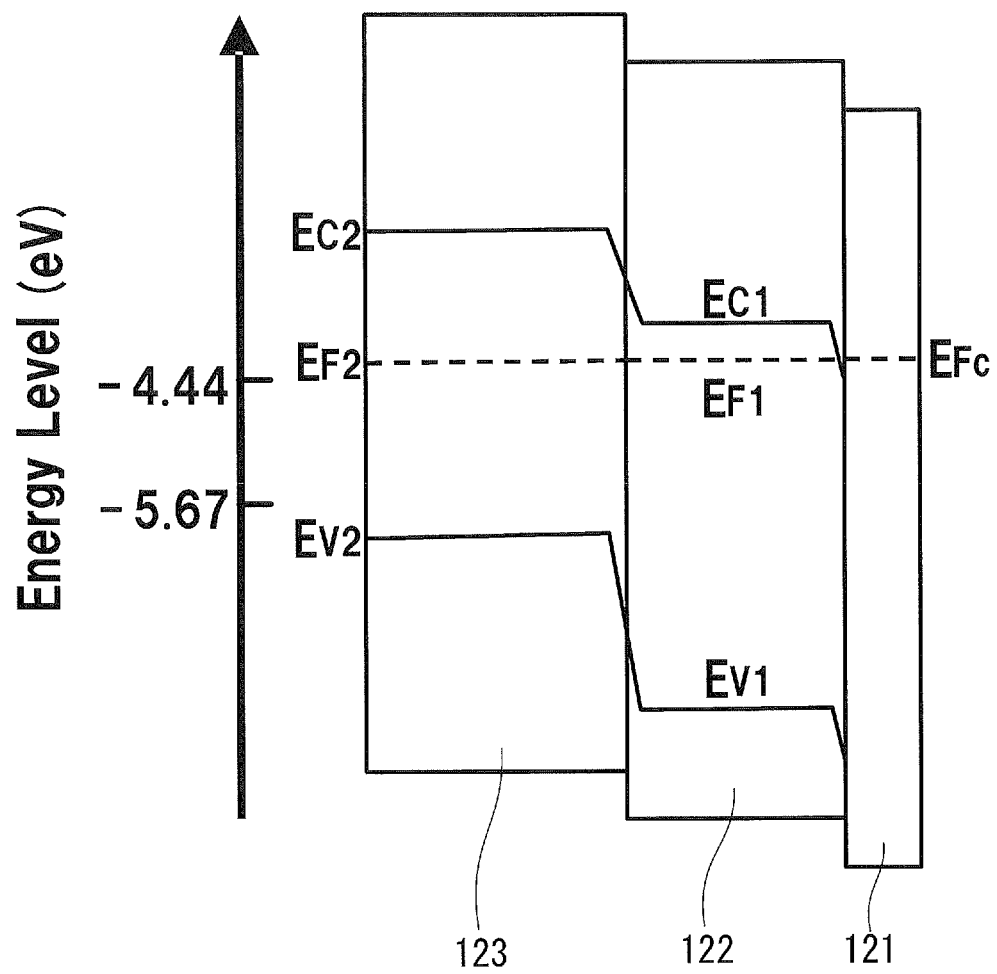
FIG. 4 is a conceptual diagram indicating a band structure of the conductor, the first n-type semiconductor layer and the second n-type semiconductor layer, after being joined, which constitute the semiconductor electrode in the photoelectrochemical cell according to Embodiment 1 of the present invention.

The configuration of a photoelectrochemical cell according to Embodiment 1 of the present invention is described with reference to FIG. 1 to FIG. 4. FIG. 1 is a schematic view illustrating the configuration of the photoelectrochemical cell of the present embodiment. FIG. 2 is a conceptual diagram illustrating a semiconductor electrode constituting the photoelectrochemical cell of Embodiment 1, including a partial cross-sectional view for showing the configuration of the semiconductor electrode in more detail. FIG. 3 is a conceptual diagram indicating a band structure of a conductor, a first n-type semiconductor layer and a second n-type semiconductor layer, before being joined, which constitute the semiconductor electrode in the photoelectrochemical cell of the present embodiment. FIG. 4 is a conceptual diagram indicating a band structure of the conductor, the first n-type semiconductor layer and the second n-type semiconductor layer, after being joined, which constitute the semiconductor electrode in the photoelectrochemical cell of the present embodiment. In each of FIGS. 3 and 4, the vertical axis indicates energy levels relative to the vacuum level (unit: eV).

As shown in FIG. 1, a photoelectrochemical cell 100 of the present embodiment includes a semiconductor electrode 120, a counter electrode 130 paired with the semiconductor electrode 120, an electrolyte 140 containing water, and a container 110 that has an opening and accommodates the semiconductor electrode 120, the counter electrode 130 and the electrolyte 140.

The semiconductor electrode 120 and the counter electrode 130 are disposed inside the container 110 so that the surfaces thereof are in contact with the electrolyte 140. The semiconductor electrode 120 includes a conductor 121, a first n-type semiconductor layer 122 disposed on the conductor 121, and a second n-type semiconductor layer 123 disposed on the first n-type semiconductor layer 122. A portion of the container 110 facing the second n-type semiconductor layer 123 of the semiconductor electrode 120 that is disposed inside the container 110 (which is, hereinafter, abbreviated as a light incident portion 110a) is made of a material that transmits light such as sunlight.

The conductor 121 of the semiconductor electrode 120 is connected electrically to the counter electrode 130 by a conducting wire 150. Here, the counter electrode means an electrode that can exchange electrons with a semiconductor electrode without the intermediation of an electrolyte. Accordingly, there is no limitation on the positional relationship and the like of the counter electrode 130 with the semiconductor electrode 120, as long as the counter electrode 130 is connected electrically to the conductor 121 that constitutes the semiconductor electrode 120. It should be noted that since an n-type semiconductor is used for the semiconductor electrode 120 in the present embodiment, the counter electrode 130 should be an electrode capable of receiving electrons from the semiconductor electrode 120 without the intermediation of the electrolyte 140.

As shown in FIG. 2, in the semiconductor electrode 120, the first n-type semiconductor layer 122 having a nanotube array structure is provided on the conductor 121. The nanotube array structure means a structure obtained by orienting a plurality of nanotubes 1221 so as to extend in an almost perpendicular direction with respect to the surface of a substrate (here, the conductor 121). The second n-type semiconductor layer 123 disposed on the first n-type semiconductor layer 122 is formed as a film provided on the surfaces of these nanotubes 1221. Although the second n-type semiconductor layer 123 shown in FIG. 2 covers the entire surfaces of the nanotubes 1221, the configuration is not limited to this. The surfaces of the nanotubes 1221 may have a portion that is not covered with the second n-type semiconductor layer 123.

The methods for producing the first n-type semiconductor layer 122 having such a nanotube array structure and the second n-type semiconductor layer 123 are described later.

Next, the operation of the photoelectrochemical cell 100 of the present embodiment is described with reference to FIG. 1 to FIG. 4.

When the second n-type semiconductor layer 123 of the semiconductor electrode 120 disposed inside the container 110 is irradiated with sunlight from the light incident portion 110a of the container 110 in the photoelectrochemical cell 100, electrons are generated in the conduction band and holes are generated in the valence band in the second n-type semiconductor layer 123. The holes generated at this time transfer toward the surface side of the second n-type semiconductor layer 123. Thereby, water is decomposed on the surface of the second n-type semiconductor layer 123 according to the reaction formula (1) below, so that oxygen is generated. On the other hand, the electrons transfer toward the conductor 121 along the bending of the band edge of the conduction band at the interface between the second n-type semiconductor layer 123 and the first n-type semiconductor layer 122 and at the interface between the first n-type semiconductor layer 122 and the conductor 121. The electrons that have transferred to the conductor 121 transfer toward the side of the counter electrode 130 connected electrically to the semiconductor electrode 120 through the conducting wire 150. Thereby, hydrogen is generated on the surface of the counter electrode 130 according to the reaction formula (2) below.

$$4h^+ + 2H_2O \rightarrow O_2\uparrow + 4H^+ \qquad (1)$$

$$4e^- + 4H^+ \rightarrow 2H_2\uparrow \qquad (2)$$

As is described in detail later, since no Schottky barriers occur at the junction plane between the first n-type semiconductor layer 122 and the second n-type semiconductor layer 123, the electrons can transfer from the second n-type semiconductor layer 123 to the first n-type semiconductor layer 122 without being prevented. Furthermore, since no Schottky barriers occur also at the junction plane between the first n-type semiconductor layer 122 and the conductor 121, the electrons can transfer from the first n-type semiconductor layer 122 to the conductor 121 without being prevented. Accordingly, the probability of the recombination between the electrons and holes generated by photoexcitation inside the second n-type semiconductor layer 123 is reduced. Thus, according to the photoelectrochemical cell 100 of the present embodiment, it is possible to improve the quantum efficiency of the hydrogen evolution reaction by irradiation with light.

In the photoelectrochemical cell according to the present invention, the first n-type semiconductor layer 122 has a large surface area because it has the nanotube array structure. Accordingly, the second n-type semiconductor layer 123 formed on the surface of the first n-type semiconductor layer 122 also has a large surface area. This makes it possible to generate electrons and holes by utilizing efficiently the sunlight applied to the second n-type semiconductor layer 123.

Furthermore, each of the nanotubes 1221 constituting the first n-type semiconductor layer 122 has high crystallinity in the lengthwise direction (here, the almost perpendicular direction with respect to the surface of the conductor 121). Conceivably, this increases, inside the first n-type semiconductor layer 122, the transfer rate of the electrons in the lengthwise direction of the nanotubes 1221. Thereby, in this case, the electrons that have transferred from the second n-type semiconductor layer 123 to the first n-type semiconductor layer 122 can transfer through the nanotubes 1221 and reach the conductor 121 more smoothly than in the case where the first n-type semiconductor layer 122 is formed as one film. For these reasons, the photoelectrochemical cell according to the present invention can achieve a higher quantum efficiency compared to the case where the first n-type semiconductor layer 122 is formed as one film.

Next, the band structure of the conductor 121, the first n-type semiconductor layer 122 and the second n-type semiconductor layer 123 in the semiconductor electrode 120 is described in detail. It should be noted that the energy levels of the band structure described herein are indicated relative to the vacuum level. Hereinafter, the energy levels of the band structure of the semiconductor and the conductor described in the specification also are indicated relative to the vacuum level in the same manner.

As shown in FIG. 3, the band edge level $E_{C2}$ of the conduction band and the band edge level $E_{V2}$ of the valence band in the second n-type semiconductor layer 123, respectively, are higher than the band edge level $E_{C1}$ of the conduction band and the band edge level $E_{V1}$ of the valence band in the first n-type semiconductor layer 122.

Moreover, the Fermi level $E_{F1}$ of the first n-type semiconductor layer 122 is higher than the Fermi level $E_{F2}$ of the second n-type semiconductor layer 123, and the Fermi level $E_{Fc}$ of the conductor 121 is higher than the Fermi level $E_{F1}$ of the first n-type semiconductor layer 122.

Next, when the conductor 121, the first n-type semiconductor layer 122 and the second n-type semiconductor layer 123 are joined to one another, carriers transfer between the first n-type semiconductor layer 122 and the second n-type semiconductor layer 123 so that the Fermi levels match each other, thereby causing bending of the band edge, at the junction plane therebetween, as shown in FIG. 4. At this time, the band edge level $E_{C2}$ of the conduction band and the band edge level $E_{V2}$ of the valence band in the second n-type semiconductor layer 123, respectively, are higher than the band edge level $E_{C1}$ of the conduction band and the band edge level $E_{V1}$ of the valence band in the first n-type semiconductor layer 122, and the Fermi level $E_{F1}$ of the first n-type semiconductor layer 122 is higher than the Fermi level $E_{F2}$ of the second n-type semiconductor layer 123. Therefore, no Schottky barriers occur at the junction plane between the first n-type semiconductor layer 122 and the second n-type semiconductor layer 123.

Also at the junction plane between the conductor 121 and the first n-type semiconductor layer 122, carriers transfer so that the Fermi levels match each other, thereby causing bending of the band edge around the junction plane. At this time, since the Fermi level $E_{Fc}$ of the conductor 121 is higher than the Fermi level $E_{F1}$ of the first n-type semiconductor layer 122, the junction between the conductor 121 and the first n-type semiconductor layer 122 is formed by an ohmic contact.

When the above-mentioned semiconductor electrode 120 is made to be in contact with the electrolyte 140, the band edge level $E_{C2}$ of the conduction band and the band edge level $E_{V2}$ of the valence band around the surface of the second n-type semiconductor layer 123 are raised at the interface between the second n-type semiconductor layer 123 and the electrolyte 140. This causes bending of the band edge of the conduction band and bending of the band edge of the valence band around the surface of the second n-type semiconductor layer 123. That is, a space charge layer occurs around the surface of the second n-type semiconductor layer 123.

As a comparative embodiment, an embodiment having a band edge level of the conduction band in the second n-type semiconductor layer lower than the band edge level of the conduction band in the first n-type semiconductor layer is assumed. In this case, a square well potential is developed in the band edge level of the conduction band inside the second n-type semiconductor layer due to the bending of the band edge of the conduction band around the surface of the second n-type semiconductor layer and the difference in the band edge levels of the conduction band between the first n-type semiconductor layer and the second n-type semiconductor layer. This square well potential causes the electrons to be accumulated inside the second n-type semiconductor layer, and the probability of recombination between the electrons and holes generated by photoexcitation to increase.

In contrast, in the photoelectrochemical cell 100 of the present embodiment, since the band edge level $E_{C2}$ of the conduction band in the second n-type semiconductor layer 123 is set higher than the band edge level $E_{C1}$ of the conduction band in the first n-type semiconductor layer 122, no square well potential as mentioned above occurs in the band edge level of the conduction band inside the second n-type semiconductor layer 123. Therefore, the electrons are not accumulated inside the second n-type semiconductor layer 123 and can transfer toward the side of the first n-type semiconductor layer 122, so that the efficiency of charge separation is improved significantly.

Further, as another comparative embodiment, an embodiment having a band edge level of the valence band in the second n-type semiconductor layer lower than the band edge level of the valence band in the first n-type semiconductor layer 122 is assumed. In this case, a square well potential is developed in the band edge level of the valence band inside the second n-type semiconductor layer due to the bending of the band edge of the valence band around the surface of the second n-type semiconductor layer and the difference in the band edge levels of the valence band between the first n-type semiconductor layer and the second n-type semiconductor layer. This square well potential causes the holes that have been generated inside the second n-type semiconductor layer by photoexcitation to transfer separately in the interface direction with the electrolyte and in the interface direction with the first n-type semiconductor layer.

In contrast, in the photoelectrochemical cell 100 of the present embodiment, since the band edge level $E_{V2}$ of the valence band in the second n-type semiconductor layer 123 is set higher than the band edge level $E_{V1}$ of the valence band in the first n-type semiconductor layer 122, no square well potential as mentioned above occurs in the band edge level $E_{V2}$ of the valence band inside the second n-type semiconductor layer 123. Therefore, the holes are not accumulated inside the second n-type semiconductor layer 123 and can transfer toward the interface direction with the electrolyte 140, so that the efficiency of charge separation is improved significantly.

Furthermore, in the photoelectrochemical cell 100 of the present embodiment, the Fermi level $E_{F1}$ of the first n-type semiconductor layer 122 is set higher than the Fermi level $E_{F2}$ of the second n-type semiconductor layer 123. This configuration causes band bending but no Schottky barriers at the interface between the first n-type semiconductor layer 122 and the second n-type semiconductor layer 123. As a result, among the electrons and holes generated by photoexcitation inside the second n-type semiconductor layer 123, the electrons transfer to the conduction band of the first n-type semiconductor layer 122, and the holes transfer in the valence band toward the interface direction with the electrolyte 140. Therefore, efficient charge separation between the electrons and holes is possible without being prevented by Schottky barriers. This reduces the probability of the recombination between the electrons and holes generated by photoexcitation inside the second n-type semiconductor layer 123, therefore improving the quantum efficiency of the hydrogen evolution reaction by irradiation with light.

Moreover, in the photoelectrochemical cell 100 of the present embodiment, the Fermi level of the conductor 121 is set higher than the Fermi level of the first n-type semiconductor layer 122. This configuration causes no Schottky barriers also at the junction plane between the conductor 121 and the first n-type semiconductor layer 122. Therefore, the electrons can transfer from the first n-type semiconductor layer 122 to the conductor 121 without being prevented by Schottky barriers. This further reduces the probability of the recombination between the electrons and holes generated by photoexcitation inside the second n-type semiconductor layer 123, therefore further improving the quantum efficiency of the hydrogen evolution reaction by irradiation with light.

In the present embodiment, in the case where the semiconductor electrode 120 is in contact with the electrolyte 140 at a pH of 0 and a temperature of 25° C., the Fermi level $E_{F1}$ of the first n-type semiconductor layer 122 is −4.44 eV or more and the band edge level $E_{V2}$ of the valence band in the second n-type semiconductor layer 123 is −5.67 eV or less. When the semiconductor electrode 120 satisfies such energy levels, the Fermi level $E_{Fc}$ of the conductor 121 in contact with the first n-type semiconductor layer 122 is allowed to be −4.44 eV or more. This value of −4.44 eV is the oxidation reduction potential of hydrogen. Thus, hydrogen ions are reduced efficiently on the surface of the counter electrode 130 that is connected electrically with the conductor 121, and therefore hydrogen can be generated efficiently.

Moreover, the band edge level $E_{V2}$ of the valence band in the second n-type semiconductor layer 123 is −5.67 eV or less. This value of −5.67 eV is the oxidation reduction potential of water. Thus, water is oxidized efficiently on the surface of the second n-type semiconductor layer 123, and therefore oxygen can be generated efficiently.

As described above, when the semiconductor electrode 120 is in contact with the electrolyte 140 at a pH of 0 and a temperature of 25° C. water can be decomposed efficiently by setting the Fermi level $E_{F1}$ of the first n-type semiconductor layer 122 to −4.44 eV or more and the band edge level $E_{V2}$ of the valence band in the second n-type semiconductor layer 123 to −5.67 eV or less.

It should be noted that although the semiconductor electrode 120 that satisfies such energy levels as mentioned above is exemplified in the present embodiment, the Fermi level $E_{F1}$ of the first n-type semiconductor layer 122 may be less than −4.44 eV, and the band edge level $E_{V2}$ of the valence band in the second n-type semiconductor layer 123 may exceed −5.67 eV, for example. Also in such a case, it is possible to generate hydrogen and oxygen.

Here, the Fermi level and the potential (band edge level) at the bottom of the conduction band of each of the first n-type semiconductor layer 122 and the second n-type semiconductor layer 123 can be calculated using the flat band potential and carrier concentration. The flat band potential and carrier concentration of a semiconductor can be determined from the Mott-Schottky plot obtained by measurement using a semiconductor that is a measurement object as an electrode.

Furthermore, the Fermi level of each of the first n-type semiconductor layer 122 and the second n-type semiconductor layer 123 in the state of being in contact with the electrolyte 140 at a pH of 0 and a temperature of 25° C. can be determined by measurement of the Mott-Schottky plot using a semiconductor that is a measurement object as an electrode in the state where the semiconductor electrode is in contact with an electrolyte at a pH of 0 and a temperature of 25° C.

The potential (band edge level) at the top of the valence band in each of the first n-type semiconductor layer 122 and the second n-type semiconductor layer 123 can be calculated using the band gap and the potential at the bottom of the conduction band in each of the n-type semiconductor layer 122 and the second n-type semiconductor layer 123 calculated by the above-mentioned method. Here, the band gap of each of the n-type semiconductor layer 122 and the second n-type semiconductor layer 123 can be obtained from the optical absorption edge to be observed in the measurement of the light absorption spectrum of a semiconductor that is a measurement object.

The Fermi level of the conductor 121 can be determined, for example, by photoelectron spectroscopy.

Next, the material of each constituent member provided in the photoelectrochemical cell 100 of the present embodiment is described.

Examples of the semiconductor to be used for the first n-type semiconductor layer 122 and the second n-type semiconductor layer 123 include oxide, sulfide, selenide, telluride, nitride, oxynitride, phosphide and the like containing titanium, zirconium, vanadium, niobium, tantalum, chromium, molybdenum, tungsten, manganese, iron, cobalt, zinc, cadmium or the like, as a constituent element.

As the first n-type semiconductor layer 122, oxide that contains titanium, zirconium, niobium or zinc, as a constituent element, is used preferably. Use of such oxide allows the Fermi level $E_{F1}$ of the first n-type semiconductor layer 122 to be set to −4.44 eV or more, relative to the vacuum level, while the semiconductor electrode 120 is in contact with the electrolyte 140 at a pH of 0 and a temperature of 25° C. The first n-type semiconductor layer 122 may be formed of a single substance of the above-mentioned oxides, or may be formed of a complex compound containing the above-mentioned oxide. Also, the first n-type semiconductor layer 122 may be the above-mentioned oxide additionally containing alkali metal ions, alkaline earth metal or the like. The nanotube array using these semiconductor materials can be produced by anodic oxidation, for example. The most appropriate production conditions can be selected suitably according to the selected semiconductor material.

Among the above-mentioned semiconductor materials, titanium oxide is used particularly preferably for the first n-type semiconductor layer 122. This is because the nanotube array composed of titanium oxide can be obtained by anodic oxidation of titanium metal, and it is easiest to use titanium oxide, among the above-mentioned semiconductor materials, when producing the nanotube array. Specifically, a titanium metal plate is immersed in an electrolyte and used as an anode, a platinum wire, for example, is used as a cathode and a voltage is applied to them to perform anodic oxidation, so that titanium oxide nanotubes can be grown on the titanium metal plate.

The thickness of the first n-type semiconductor layer 122, that is, the length of the nanotubes 1221, is not particularly limited. Preferably, it is 100 to 1000 nm. A thickness of 100 nm or more makes it possible to ensure a larger amount of light absorption, and a thickness of 1000 nm or less makes it possible to suppress an excess increase in resistance.

The carrier concentration of the second n-type semiconductor layer 123 preferably is lower than the carrier concentration of the first n-type semiconductor layer 122. The second n-type semiconductor layer 123 preferably is one selected from the group consisting of oxide, nitride and oxynitride. Thereby, stable operation of the photoelectrochemical cell is possible because the second n-type semiconductor layer 123 is prevented from dissolving in the electrolyte 140, even if the second n-type semiconductor layer 123 is irradiated with light in the state where the semiconductor electrode 120 is in contact with the electrolyte 140. The second n-type semiconductor layer 123 can be produced by forming a semiconductor material coating film on the surfaces of the nanotubes 1221 formed on the conductor 121 by using a method such as chemical precipitation, vacuum deposition, sputtering and CVD.

In the case of using titanium oxide for the first n-type semiconductor layer 122, tantalum nitride, tantalum oxynitride or cadmium sulfide, for example, can be used for the second n-type semiconductor layer 123. Among these, use of tantalum nitride or tantalum oxynitride is preferable. Thereby, stable operation of the photoelectrochemical cell is possible because the second n-type semiconductor layer 123 is prevented from dissolving in the electrolyte, even if the second n-type semiconductor layer 123 is irradiated with light in the state where the semiconductor electrode 120 is in contact with the electrolyte 140.

In the present embodiment, the conductor 121 of the semiconductor electrode 120 is joined to the first n-type semiconductor layer 122 by an ohmic contact. Accordingly, for the conductor 121, electrically conductive materials such as ITO (Indium Tin Oxide) and FTO (Fluorine doped Tin Oxide), or metals such as Ti, Ni, Ta, Nb, Al and Ag can be used, for example.

It is preferable that, in the surface of the conductor 121, the area that is not covered by the first n-type semiconductor layer 122 be covered, for example, by an insulating material such as a resin. With such a configuration, the conductor 121 can be prevented from dissolving in the electrolyte 140.

Preferably, a material with a low overvoltage is used for the counter electrode 130. In the present embodiment, since an n-type semiconductor is used for the semiconductor electrode 120, hydrogen is generated at the counter electrode 130. Therefore, Pt, Au, Ag, Fe or the like is used preferably as the counter electrode 130, for example.

Any electrolyte containing water can be used for the electrolyte 140. The electrolyte containing water may be acidic or alkali. In the case where a solid electrolyte is disposed between the semiconductor electrode 120 and the counter electrode 130, the electrolyte 140 in contact with the second n-type semiconductor layer 123 of the semiconductor electrode 120 and the surface of the counter electrode 130 can be replaced by pure water for electrolysis.

(Embodiment 2)

Figure 5:
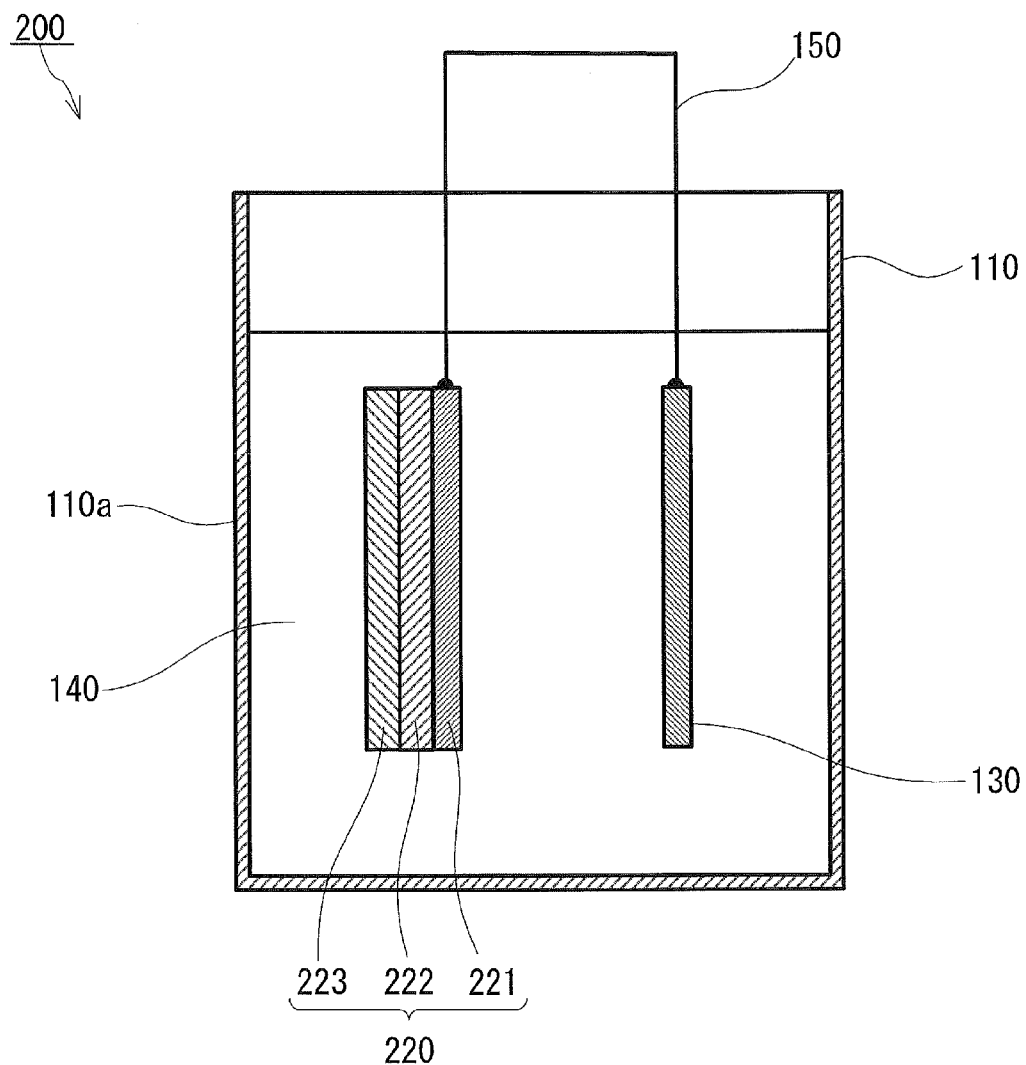
FIG. 5 is a schematic view illustrating the configuration of a photoelectrochemical cell according to Embodiment 2 of the present invention.
Figure 6:
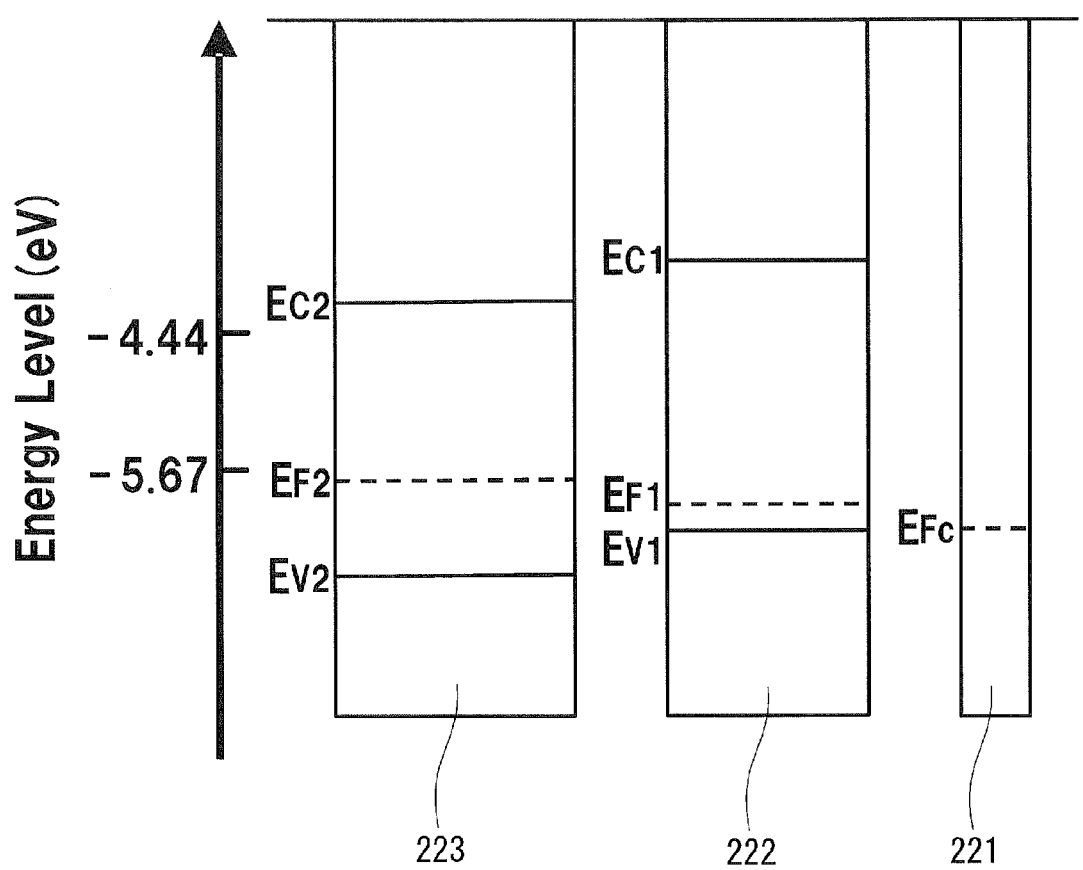
FIG. 6 is a conceptual diagram indicating a band structure of a conductor, a first p-type semiconductor layer and a second p-type semiconductor layer, before being joined, which constitute a semiconductor electrode in the photoelectrochemical cell according to Embodiment 2 of the present invention.
Figure 7:
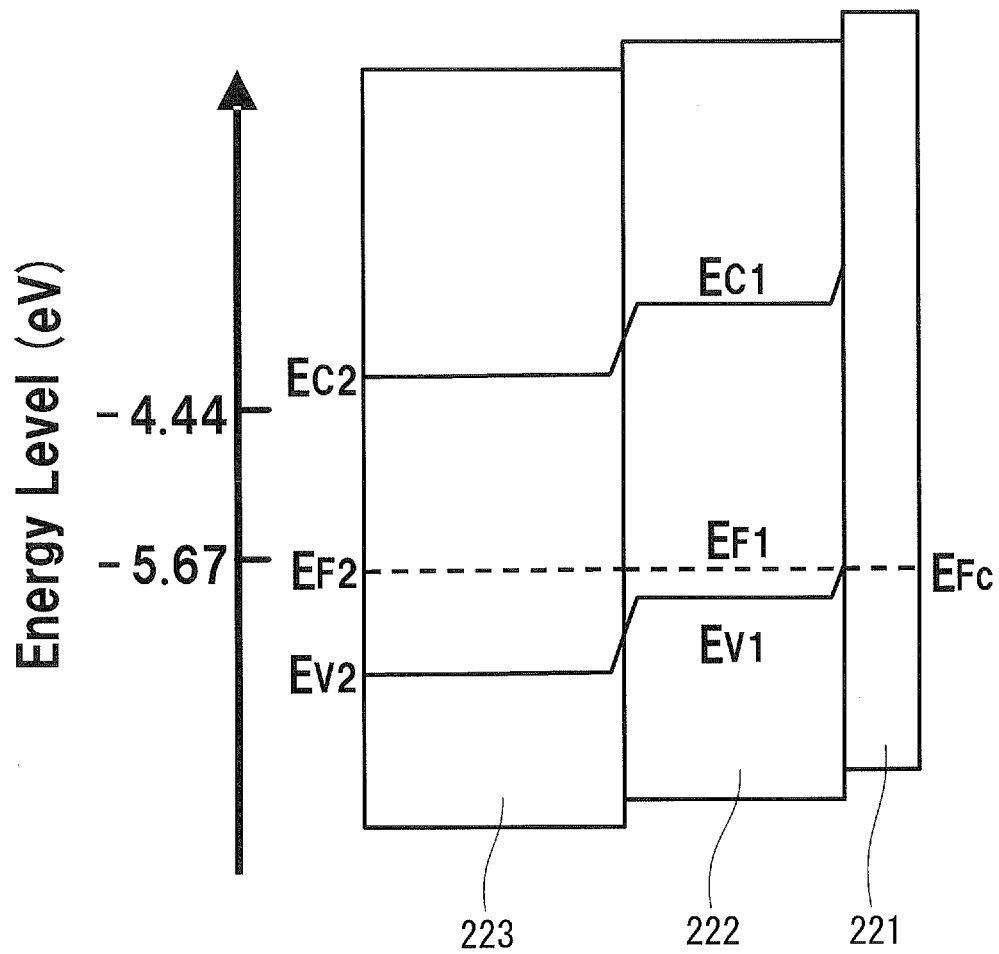
FIG. 7 is a conceptual diagram indicating a band structure of the conductor, the first p-type semiconductor layer and the second p-type semiconductor layer, after being joined, which constitute the semiconductor electrode in the photoelectrochemical cell according to Embodiment 2 of the present invention.

The configuration of a photoelectrochemical cell according to Embodiment 2 of the present invention is described with reference to FIG. 5 to FIG. 7. FIG. 5 is a schematic view illustrating the configuration of the photoelectrochemical cell of the present embodiment. FIG. 6 is a conceptual diagram indicating a band structure of a conductor, a first p-type semiconductor layer and a second p-type semiconductor layer, before being joined, which constitute a semiconductor electrode in the photoelectrochemical cell of the present embodiment. FIG. 7 is a conceptual diagram indicating a band structure of the conductor, the first p-type semiconductor layer and the second p-type semiconductor layer, after being joined, which constitute the semiconductor electrode in the photoelectrochemical cell of the present embodiment.

As shown in FIG. 5, a photoelectrochemical cell 200 of the present embodiment has the same configuration as that of the photoelectrochemical cell 100 of Embodiment 1 except that a semiconductor electrode 220 has a different configuration from that of the semiconductor electrode 120 of Embodiment 1. Accordingly, only the semiconductor electrode 220 is described in the present embodiment. The same components as those in the photoelectrochemical cell 100 of Embodiment 1 are indicated with identical numerals, and the descriptions thereof are omitted.

The semiconductor electrode 220 is disposed so that the surface thereof is in contact with the electrolyte 140, as in Embodiment 1. The semiconductor electrode 220 includes a conductor 221, a first p-type semiconductor layer 222 that is disposed on the conductor 221 and has a nanotube array structure, and a second p-type semiconductor layer 223 disposed on the first p-type semiconductor layer 222. The second p-type semiconductor layer 223 faces the light incident portion 110a of the container 110.

The first p-type semiconductor layer 222 and the second p-type semiconductor layer 223 in the present embodiment, respectively, have the same configurations as those of the first n-type semiconductor layer 122 and the second n-type semiconductor layer 123 described in Embodiment 1 with reference to FIG. 2.

The conductor 221 of the semiconductor electrode 220 is connected electrically to the counter electrode 130 by the conducting wire 150.

Next, the operation of the photoelectrochemical cell 200 of the present embodiment is described with reference to FIG. 5 to FIG. 7.

When the second p-type semiconductor layer 223 of the semiconductor electrode 220 disposed inside the container 110 is irradiated with sunlight from the light incident portion 110a of the container 110 in the photoelectrochemical cell 200, electrons are generated in the conduction band and holes are generated in the valence band in the second p-type semiconductor layer 223. The holes thus generated transfer to the conductor 221 along the bending of the band edge of the valence band at the interface between the second p-type semiconductor layer 223 and the first p-type semiconductor layer 222 and at the interface between the first p-type semiconductor layer 222 and the conductor 221. The holes that have transferred to the conductor 221 transfer toward the side of the counter electrode 130 connected electrically to the semiconductor electrode 220 through the conducting wire 150. Thereby, oxygen is generated due to decomposition of water on the surface of the counter electrode 130 according to the above reaction formula (1). On the other hand, the electrons transfer toward the surface side of the second p-type semiconductor layer 223 (the side of the interface with the electrolyte 140). Thereby, hydrogen is generated on the surface of the second p-type semiconductor layer 223 according to the above reaction formula (2).

As is described in detail later, since no Schottky barriers occur at the junction plane between the first p-type semiconductor layer 222 and the second p-type semiconductor layer 223, the holes can transfer from the second p-type semiconductor layer 223 to the first p-type semiconductor layer 222 without being prevented. Furthermore, since no Schottky barriers occur also at the junction plane between the conductor 221 and the first p-type semiconductor layer 222, the holes can transfer from the first p-type semiconductor layer 222 to the conductor 221 without being prevented. Accordingly, the probability of the recombination between the electrons and holes generated by photoexcitation inside the second p-type semiconductor layer 223 is reduced. Thus, according to the photoelectrochemical cell 200 in the present embodiment, it is possible to improve the quantum efficiency of the hydrogen evolution reaction by irradiation with light.

Moreover, in the photoelectrochemical cell 200 of the present embodiment, the first p-type semiconductor layer 222 has a nanotube array structure. Thus, the second p-type semiconductor layer 223 formed on the surface of first p-type semiconductor layer 222 also has a large surface area as in Embodiment 1. This makes it possible to generate electrons and holes by utilizing efficiently the sunlight applied to the second p-type semiconductor layer 223. Furthermore, each of nanotubes constituting the first p-type semiconductor layer 222 has high crystallinity in the lengthwise direction, as in Embodiment 1. Conceivably, this increases, inside the first p-type semiconductor layer 222, the transfer rate of the holes in the lengthwise direction of the nanotubes. Thereby, in this case, the holes that have transferred from the second p-type semiconductor layer 223 to the first p-type semiconductor layer 222 can transfer through the nanotubes and reach the conductor 221 more smoothly than in the case where the first p-type semiconductor layer 222 is formed as one film. For these reasons, the photoelectrochemical cell 200 of the present embodiment can achieve a higher quantum efficiency compared to the case where the first n-type semiconductor layer 222 is formed as one film.

Next, the band structure of the conductor 221, the first p-type semiconductor layer 222 and the second p-type semiconductor layer 223 in the semiconductor electrode 220 is described.

As shown in FIG. 6, the band edge level $E_{C2}$ of the conduction band and the band edge level $E_{V2}$ of the valence band in the second p-type semiconductor layer 223, respectively, are lower than the band edge level $E_{C1}$ of the conduction band and the band edge level $E_{V1}$ of the valence band in the first p-type semiconductor layer 222.

Moreover, the Fermi level $E_{F1}$ of the first p-type semiconductor layer 222 is lower than the Fermi level $E_{F2}$ of the second p-type semiconductor layer 223, and the Fermi level $E_{Fc}$ of the conductor 221 is lower than the Fermi level $E_{F1}$ of the first p-type semiconductor layer 222.

Next, when the conductor 221, the first p-type semiconductor layer 222 and the second p-type semiconductor layer 223 are joined to one another, carriers transfer between the first p-type semiconductor layer 222 and the second p-type semiconductor layer 223 so that the Fermi levels match each other, thereby causing bending of the band edge, at the junction plane therebetween, as shown in FIG. 7. The band edge level $E_{C2}$ of the conduction band and the band edge level $E_{V2}$ of the valence band in the second p-type semiconductor layer 223, respectively, are lower than the band edge level $E_{C1}$ of the conduction band and the band edge level $E_{V1}$ of the valence band in the first p-type semiconductor layer 222, and the Fermi level $E_{F1}$ of the first p-type semiconductor layer 222 is lower than the Fermi level $E_{F2}$ of the second p-type semiconductor layer 223. Therefore, no Schottky barriers occur at the junction plane between the first p-type semiconductor layer 222 and the second p-type semiconductor layer 223.

At the junction plane between the first p-type semiconductor layer 222 and the conductor 221, carriers transfer so that the Fermi levels match each other, thereby causing bending of the band edge around the junction plane of the first p-type semiconductor layer 222. Since the Fermi level $E_{Fc}$ of the conductor 221 is lower than the Fermi level $E_{F1}$ of the first p-type semiconductor layer 222, the junction between the conductor 221 and the first p-type semiconductor layer 222 is formed by an ohmic contact.

When the above-mentioned semiconductor electrode 220 is made to be in contact with the electrolyte 140, the band edge level $E_{C2}$ of the conduction band and the band edge level $E_{V2}$ of the valence band around the surface of the second p-type semiconductor layer 223 are lowered at the interface between the second p-type semiconductor layer 223 and the electrolyte 140. This causes bending of the band edge of the conduction band and bending of the band edge of the valence band around the surface of the second p-type semiconductor layer 223. That is, a space charge layer occurs around the surface of the second p-type semiconductor layer 223.

As a comparative embodiment, an embodiment having a band edge level of the conduction band in the second p-type semiconductor layer higher than the band edge level of the conduction band in the first p-type semiconductor layer is assumed. In this case, a square well potential is developed in the band edge level of the conduction band inside the second p-type semiconductor layer due to the bending of the band edge of the conduction band around the surface of the second p-type semiconductor layer and the difference in the band edge levels of the conduction band between the first p-type semiconductor layer and the second p-type semiconductor layer. This square well potential causes the electrons that have been generated inside the second p-type semiconductor layer by photoexcitation to transfer separately in the interface direction with the electrolyte and the interface direction with the first p-type semiconductor layer.

In contrast, in the photoelectrochemical cell 200 of the present embodiment, since the band edge level $E_{C2}$ of the conduction band in the second p-type semiconductor layer 223 is set lower than the band edge level $E_{C1}$ of the conduction band in the first p-type semiconductor layer 222, no square well potential as mentioned above occurs in the band edge level of the conduction band inside the second p-type semiconductor layer 223. Therefore, the electrons inside the second p-type semiconductor layer 223 transfer toward the interface direction with the electrolyte 140, so that the efficiency of charge separation is improved significantly.

Further, as another comparative embodiment, an embodiment having a band edge level of the valence band in the second p-type semiconductor layer higher than the band edge level of the valence band in the first p-type semiconductor layer is assumed. In this case, a square well potential is developed in the band edge level of the valence band inside the second p-type semiconductor layer due to the bending of the band edge of the valence band around the surface of the second p-type semiconductor layer and the difference in the band edge levels of the valence band between the first p-type semiconductor layer and the second p-type semiconductor layer. This square well potential causes the holes that have been generated by photoexcitation inside the second p-type semiconductor layer to be accumulated inside the second p-type semiconductor layer.

In contrast, in the photoelectrochemical cell 200 of the present embodiment, since the band edge level $E_{V2}$ of the valence band in the second p-type semiconductor layer 223 is set lower than the band edge level $E_{V1}$ of the valence band in the first p-type semiconductor layer 222, no square well potential as mentioned above occurs in the band edge level of the valence band inside the second p-type semiconductor layer 223. Therefore, the holes are not accumulated inside the second p-type semiconductor layer 223 and can transfer toward the interface direction with the first p-type semiconductor layer 222, so that the efficiency of charge separation is improved significantly.

Furthermore, in the photoelectrochemical cell 200 of the present embodiment, the Fermi level $E_{F1}$ of the first p-type semiconductor layer 222 is set lower than the Fermi level $E_{F2}$ of the second p-type semiconductor layer 223, in addition to the band edge level of the conduction band and the band edge level of the valence band in the first p-type semiconductor layer 222 and the second p-type semiconductor layer 223 being set as mentioned above. This configuration causes band bending but no Schottky barriers at the interface between the first p-type semiconductor layer 222 and the second p-type semiconductor layer 223. As a result, among the electrons and holes generated by photoexcitation inside the second p-type semiconductor layer 223, the electrons transfer in the conduction band toward the interface direction with the electrolyte 140, and the holes transfer to the valence band of the first p-type semiconductor layer 222. That is, an efficient charge separation between the electrons and holes is possible without being prevented by Schottky barriers. This reduces the probability of the recombination between the electrons and holes generated by photoexcitation inside the second p-type semiconductor layer 223, therefore improving the quantum efficiency of the hydrogen evolution reaction by irradiation with light.

Furthermore, in the photoelectrochemical cell 200 of the present embodiment, the Fermi level $E_{Fc}$ of the conductor 221 is set lower than the Fermi level $E_{F1}$ of the first p-type semiconductor layer 222. This configuration causes no Schottky barriers also at the junction plane between the conductor 221 and the first p-type semiconductor layer 222. Therefore, the holes can transfer from the first p-type semiconductor layer 222 to the conductor 221 without being prevented by Schottky barriers. This further reduces the probability of the recombination between the electrons and holes generated by photoexcitation inside the second p-type semiconductor layer 223, therefore further improving the quantum efficiency of the hydrogen evolution reaction by irradiation with light.

In the present embodiment, in the case where the semiconductor electrode 220 is in contact with the electrolyte 140 at a pH of 0 and a temperature of 25° C., the Fermi level $E_{F1}$ of the first p-type semiconductor layer 222 is −5.67 eV or less and the band edge level $E_{C2}$ of the conduction band in the second p-type semiconductor layer 223 is −4.44 eV or more. When the semiconductor electrode 220 satisfies such energy levels, the Fermi level $E_{Fc}$ of the conductor 221 in contact with the first p-type semiconductor layer 222 is allowed to be −5.67 eV or less. This value of −5.67 eV is the oxidation reduction potential of water. Thus, water is oxidized efficiently on the surface of the counter electrode 130 that is connected electrically to the conductor 221, and therefore oxygen can be generated efficiently.

The band edge level $E_{C2}$ of the conduction band in the second p-type semiconductor layer 223 is allowed to be −4.44 eV or more. This value of −4.44 eV is the oxidation reduction potential of hydrogen. Thus, hydrogen ions are reduced efficiently on the surface of the second p-type semiconductor layer 223, and therefore hydrogen can be generated efficiently.

As described above, when the semiconductor electrode 220 is in contact with the electrolyte 140 at a pH of 0 and a temperature of 25° C., water can be decomposed efficiently by setting the Fermi level $E_{F1}$ of the first p-type semiconductor layer 222 to −5.67 eV or less, and the band edge level $E_{C2}$ of the conduction band in the second p-type semiconductor layer 223 to −4.44 eV or more.

It should be noted that although the semiconductor electrode 220 that satisfies such energy levels as mentioned above is exemplified in the present embodiment, the Fermi level $E_{F1}$ of the first p-type semiconductor layer 222 may exceed −5.67 eV, and the band edge level $E_{C2}$ of the conduction band in the second p-type semiconductor layer 223 may be less than −4.44 eV, for example. Also in such a case, it is possible to generate hydrogen and oxygen.

Here, the Fermi level and the potential (band edge level) at the top of the valence band in each of the first p-type semiconductor layer 222 and the second p-type semiconductor layer 223 can be calculated using the flat band potential and carrier concentration. The flat band potential and carrier concentration of a semiconductor can be determined from the Mott-Schottky plot obtained by measurement using a semiconductor that is a measurement object as an electrode.

Further, the Fermi level of each of the first p-type semiconductor layer 222 and the second p-type semiconductor layer 223 in the state of being in contact with the electrolyte 140 at a pH of 0 and a temperature of 25° C. can be determined by measurement of the Mott-Schottky plot using a semiconductor that is a measurement object as an electrode in the state where the semiconductor electrode is in contact with an electrolyte at a pH of 0 and a temperature of 25° C.

The potential (band edge level) at the bottom of the conduction band in each of the first p-type semiconductor layer 222 and the second p-type semiconductor layer 223 can be calculated using the band gap and the potential (band edge level) at the top of the valence band in each of the first p-type semiconductor layer 222 and the second p-type semiconductor layer 223 calculated by the above-mentioned method. Here, the band gap of each of the first p-type semiconductor layer 222 and the second p-type semiconductor layer 223 can be obtained from the optical absorption edge to be observed in the measurement of the light absorption spectrum of a semiconductor that is the object of the measurement.

The Fermi level of the conductor 221 can be obtained in the same manner as in Embodiment 1.

Next, the materials of the first p-type semiconductor layer 222 and the second p-type semiconductor layer 223 in the present embodiment each are described.

For the first p-type semiconductor layer 222 and the second p-type semiconductor layer 223, it is possible to use oxide, sulfide, selenide, telluride, nitride, oxynitride, phosphide and the like, that contain copper, silver, gallium, indium, germanium, tin, antimony or the like, as a constituent element.

For the first p-type semiconductor layer 222, copper oxide is used preferably. Thereby, the first p-type semiconductor layer 222 is allowed to have a Fermi level $E_{F1}$ of −5.67 eV or less in the state of being in contact with the electrolyte at a pH of 0 and a temperature of 25° C. The first p-type semiconductor layer 222 may be formed of a single substance of copper oxide, or may be formed of a complex compound containing copper oxide. Also, the first p-type semiconductor layer 222 may be the above-mentioned compound additionally containing metal ions other than copper. The nanotube array composed of copper oxide can be produced by anodic oxidation, for example.

The carrier concentration of the second p-type semiconductor layer 223 preferably is lower than the carrier concentration of the first p-type semiconductor layer 222. The second p-type semiconductor layer 223 preferably is one selected from the group consisting of oxide, nitride and oxynitride. Thereby, the second p-type semiconductor layer 223 is prevented from dissolving in the electrolyte 140, even if the second p-type semiconductor layer 223 of the semiconductor electrode 220 is irradiated with light in a state where the semiconductor electrode 220 is in contact with the electrolyte 140. Accordingly, stable operation of the photoelectrochemical cell is possible.

In the case of using copper oxide for the first p-type semiconductor layer 222, copper indium sulfide, for example, can be used for the second p-type semiconductor layer 223.

For the conductor 221, electrically conductive materials such as ITO and FTO, or metals such as Ti, Ni, Ta, Nb, Al and Ag can be used, for example. One capable of forming an ohmic contact at the junction with the first p-type semiconductor layer 222 can be selected suitably from these.

It is preferable that, in the surface of the conductor 221, the area that is not covered by the first p-type semiconductor layer 222 be covered, for example, by an insulating material such as a resin. With such a configuration, the conductor 221 can be prevented from dissolving in the electrolyte 140.

(Embodiment 3)

Figure 8:
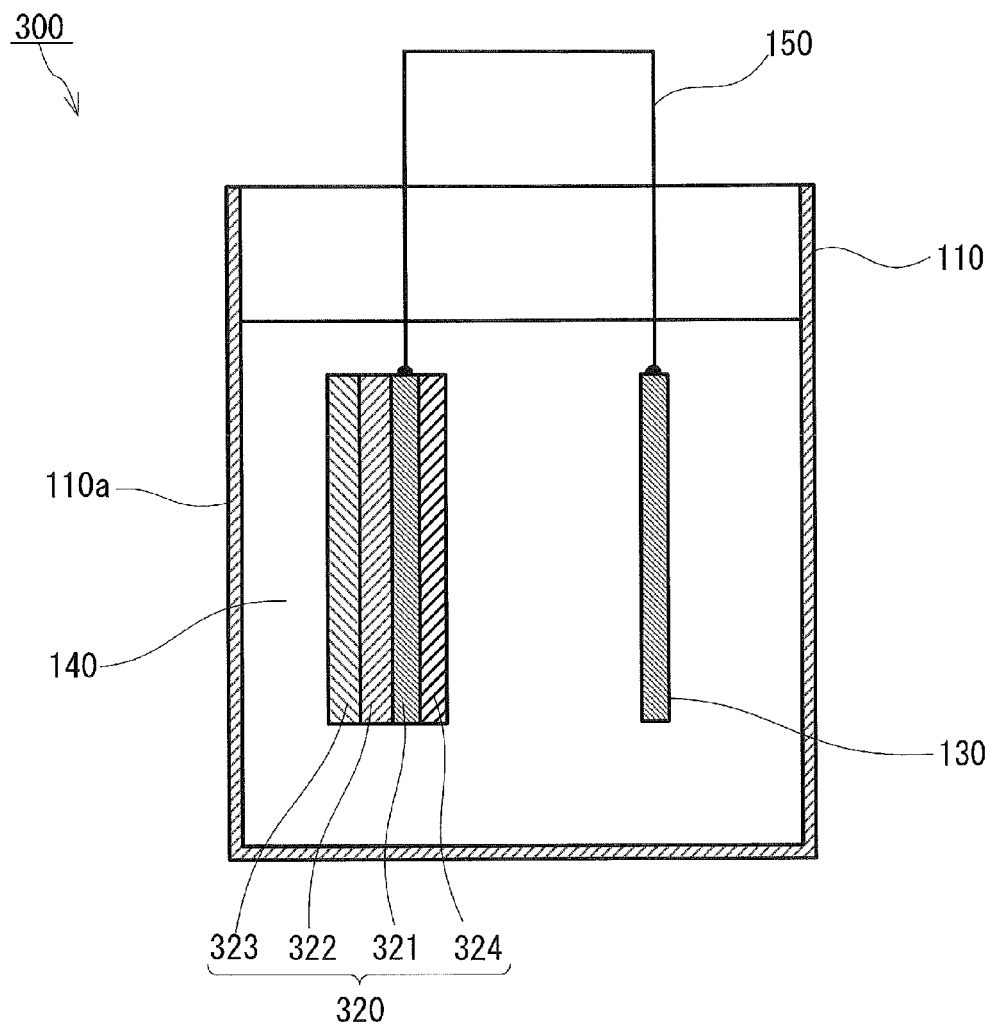
FIG. 8 is a schematic view illustrating the configuration of a photoelectrochemical cell according to Embodiment 3 of the present invention.

The configuration of a photoelectrochemical cell according to Embodiment 3 of the present invention is described with reference to FIG. 8. FIG. 8 is a schematic view illustrating the configuration of the photoelectrochemical cell of the present embodiment.

In a photoelectrochemical cell 300 of the present embodiment, a semiconductor electrode 320 includes a conductor 321, a first n-type semiconductor layer 322 disposed on the conductor 321, and a second n-type semiconductor layer 323 disposed on the first n-type semiconductor layer 322. Further, the semiconductor electrode 320 includes an insulation layer 324 disposed on the surface of the conductor 321 opposite to the surface on which the first n-type semiconductor layer 322 is disposed. The conductor 321, the first n-type semiconductor layer 322 and the second n-type semiconductor layer 323, respectively, have the same configurations as those of the conductor 121, the first n-type semiconductor layer 122 and the second n-type semiconductor layer 123 in Embodiment 1. The insulation layer 324 is formed, for example, of a resin or glass. This insulation layer 324 can prevent the conductor 321 from dissolving in the electrolyte 140. It should be noted that although the present embodiment has a configuration in which the semiconductor electrode including two n-type semiconductor layers as described in Embodiment 1 is further provided with the above-mentioned insulation layer, such an insulation layer can be used also in the semiconductor electrode as described in Embodiment 2.

(Embodiment 4)

Figure 9:
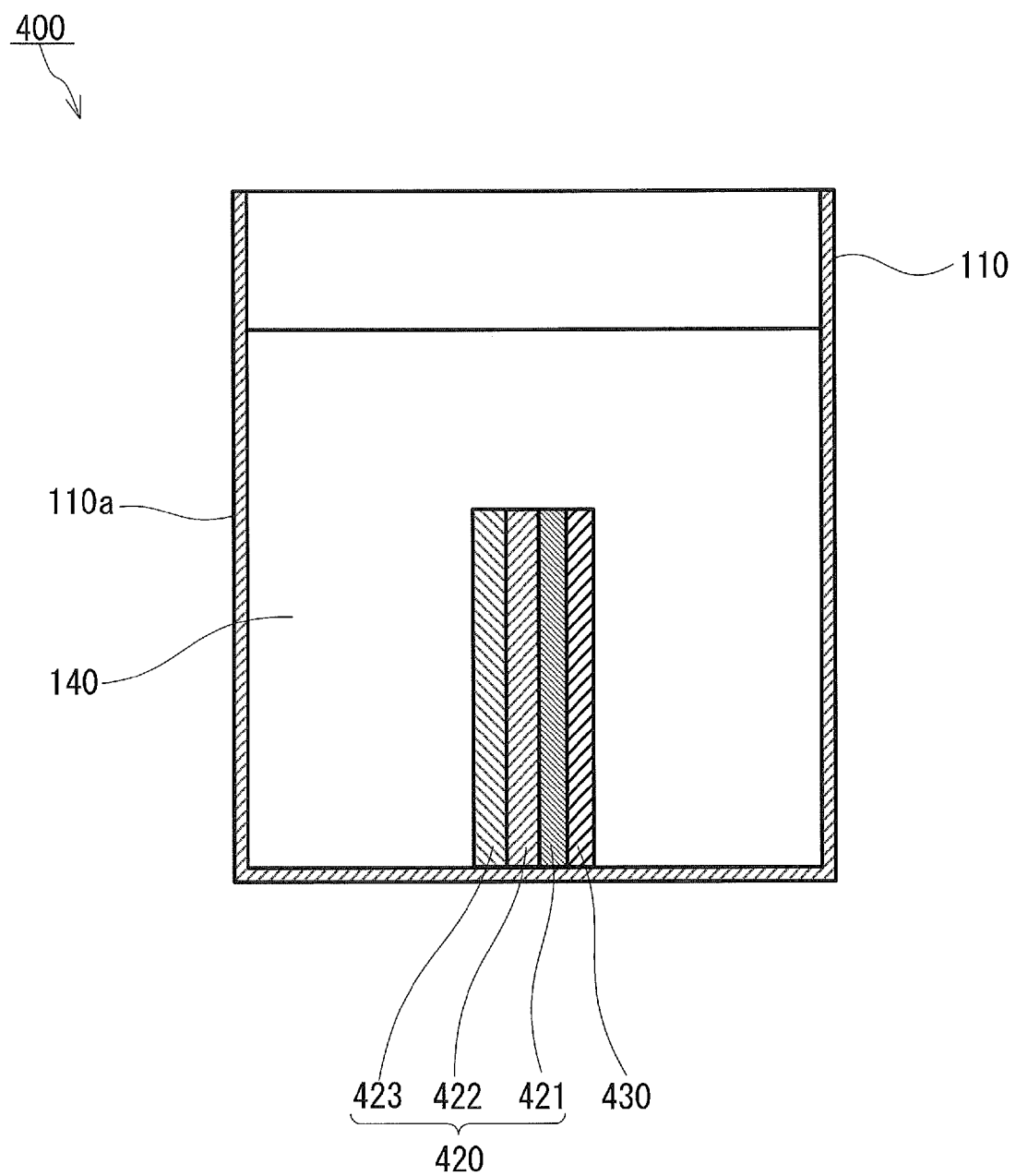
FIG. 9 is a schematic view illustrating the configuration of a photoelectrochemical cell according to Embodiment 4 of the present invention.

The configuration of a photoelectrochemical cell according to Embodiment 4 of the present invention is described with reference to FIG. 9. FIG. 9 is a schematic view illustrating the configuration of the photoelectrochemical cell of the present embodiment.

In a photoelectrochemical cell 400 of the present embodiment, a semiconductor electrode 420 includes a conductor 421, a first n-type semiconductor layer 422 disposed on the conductor 421, and a second n-type semiconductor layer 423 disposed on the first n-type semiconductor layer 422. On the other hand, a counter electrode 430 is disposed on the conductor 421 (on the surface of the conductor 421 opposite to the surface on which the first n-type semiconductor layer 422 is disposed). The conductor 421, the first n-type semiconductor layer 422 and the second n-type semiconductor layer 423, respectively, have the same configurations as those of the conductor 121, the first n-type semiconductor layer 122 and the second n-type semiconductor layer 123 in Embodiment 1.

As in the case of the present embodiment, the configuration in which the counter electrode 430 is disposed on the conductor 421 can eliminate the need for a conducting wire for connecting the semiconductor electrode 420 electrically to the counter electrode 430. This can eliminate the ohmic loss derived from the conducting wire, therefore further improving the quantum efficiency of the hydrogen evolution reaction by irradiation with light. Furthermore, with such a configuration, the semiconductor electrode 420 can be connected electrically to the counter electrode 430 by a simple and easy process. It should be noted that although the present embodiment has a configuration in which the counter electrode 430 is disposed on the surface of the conductor 421 opposite to the surface on which the first n-type semiconductor layer 422 is disposed, the counter electrode 430 can be disposed also on the same surface on which the first n-type semiconductor layer 422 is disposed. Moreover, although the present embodiment has the above-mentioned configuration in which the counter electrode is disposed on the conductor in the photoelectrochemical cell provided with two n-type semiconductor layers as described in Embodiment 1, such a configuration can be applied also to the photoelectrochemical cell as described in Embodiments 2.

(Embodiment 5)

Figure 10:
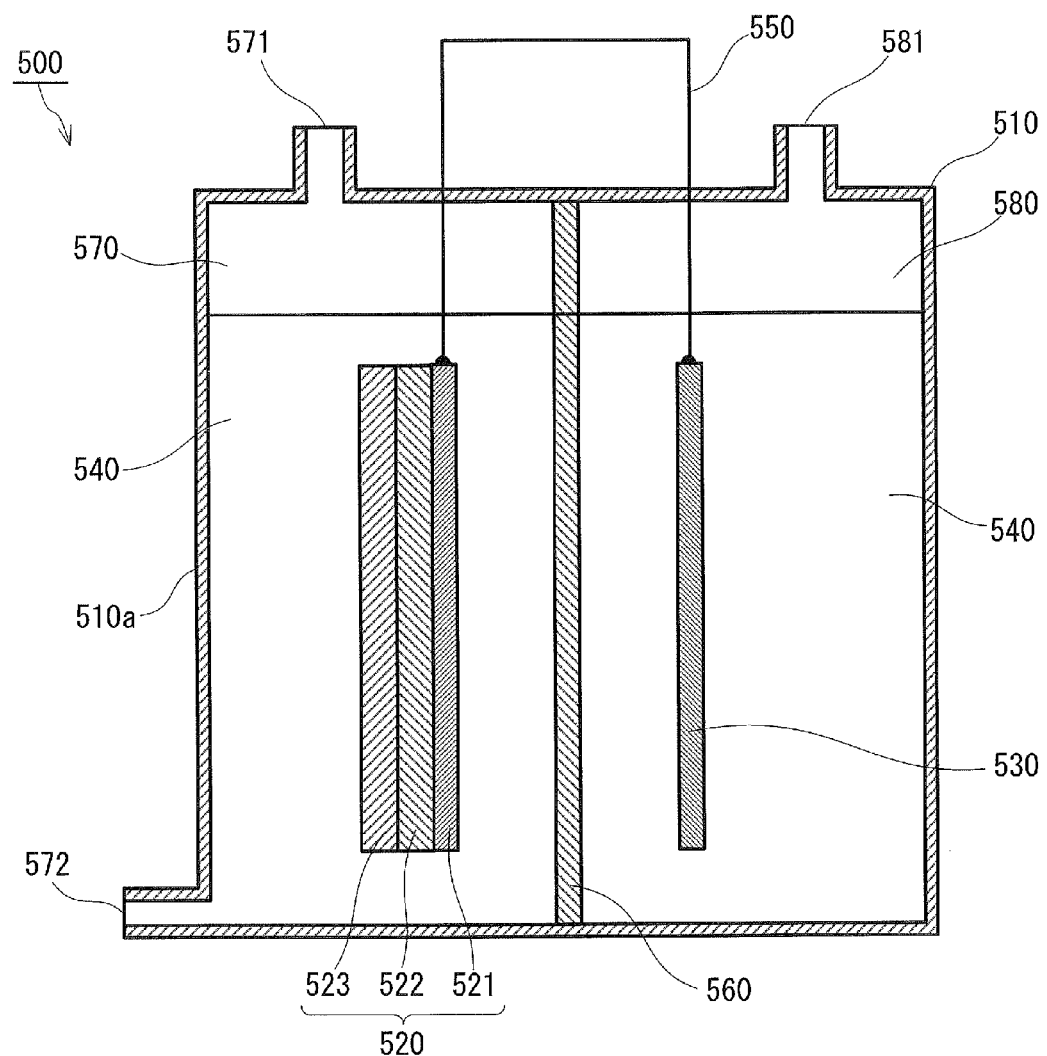
FIG. 10 is a schematic view illustrating the configuration of a photoelectrochemical cell according to Embodiment 5 of the present invention.

The configuration of a photoelectrochemical cell according to Embodiment 5 of the present invention is described with reference to FIG. 10. FIG. 10 is a schematic view illustrating the configuration of the photoelectrochemical cell of the present embodiment.

As shown in FIG. 10, a photoelectrochemical cell 500 of the present embodiment includes a housing (container) 510, a semiconductor electrode 520, a counter electrode 530 and a separator 560. The separator 560 separates the inside of the housing 510 into two chambers: a first chamber 570 and a second chamber 580. An electrolyte 540 containing water is accommodated in each of the first chamber 570 and the second chamber 580.

The semiconductor electrode 520 is disposed at a position in contact with the electrolyte 540 inside the first chamber 570. The semiconductor electrode 520 includes a conductor 521, a first n-type semiconductor layer 522 disposed on the conductor 521, and a second n-type semiconductor layer 523 disposed on the first n-type semiconductor layer 522. The first chamber 570 includes a first gas outlet 571 for discharging oxygen generated inside the first chamber 570, and a water supply opening 572 for supplying water into the first chamber 570. A portion of the housing 510 that faces the second n-type semiconductor layer 523 of the semiconductor electrode 520 disposed inside the first chamber 570 (hereinafter, abbreviated as a light incident portion 510*a*) is made of a material that transmits light such as sunlight.

On the other hand, the counter electrode 530 is disposed inside the second chamber 580 at a position in contact with the electrolyte 540. The second chamber 580 includes a second gas outlet 581 for discharging hydrogen generated inside the second chamber 580.

The conductor 521 of the semiconductor electrode 520 is connected electrically to the counter electrode 530 by a conducting wire 550.

The conductor 521, the first n-type semiconductor layer 522 and the second n-type semiconductor layer 523 of the semiconductor electrode 520 in the present embodiment, respectively, have the same configurations as those of the conductor 121, the first n-type semiconductor layer 122 and the second n-type semiconductor layer 123 of the semiconductor electrode 120 in Embodiment 1. Accordingly, the semiconductor electrode 520 has the same operational effects as those of the semiconductor electrode 120 of Embodiment 1. Furthermore, the counter electrode 530 and the electrolyte 540, respectively, are the same as the counter electrode 130 and the electrolyte 140 in Embodiment 1.

The separator 560 is formed of a material that allows the electrolyte 540 to permeate itself and has a function of blocking gas generated inside each of the first chamber 570 and the second chamber 580. Examples of the material of the separator 560 include a solid electrolyte such as polymeric solid electrolyte. As the polymeric solid electrolyte, an ion exchange membrane such as Nafion (registered trademark) can be mentioned, for example. Oxygen and hydrogen generated inside the container can be separated easily with a configuration in which, after the internal space of the container is separated into two areas using such a separator, the electrolyte and the surface of the semiconductor electrode (semiconductor layer) are made in contact in one of the areas while the electrolyte and the surface of the counter electrode are made in contact in the other area.

It should be noted that although the photoelectrochemical cell 500 using the semiconductor electrode 520 that has the same configuration as that of the semiconductor electrode 120 in Embodiment 1 is described in the present embodiment, it also is possible to use the semiconductor electrode 220 in Embodiment 2 instead of the semiconductor electrode 520.

(Embodiment 6)

Figure 11:
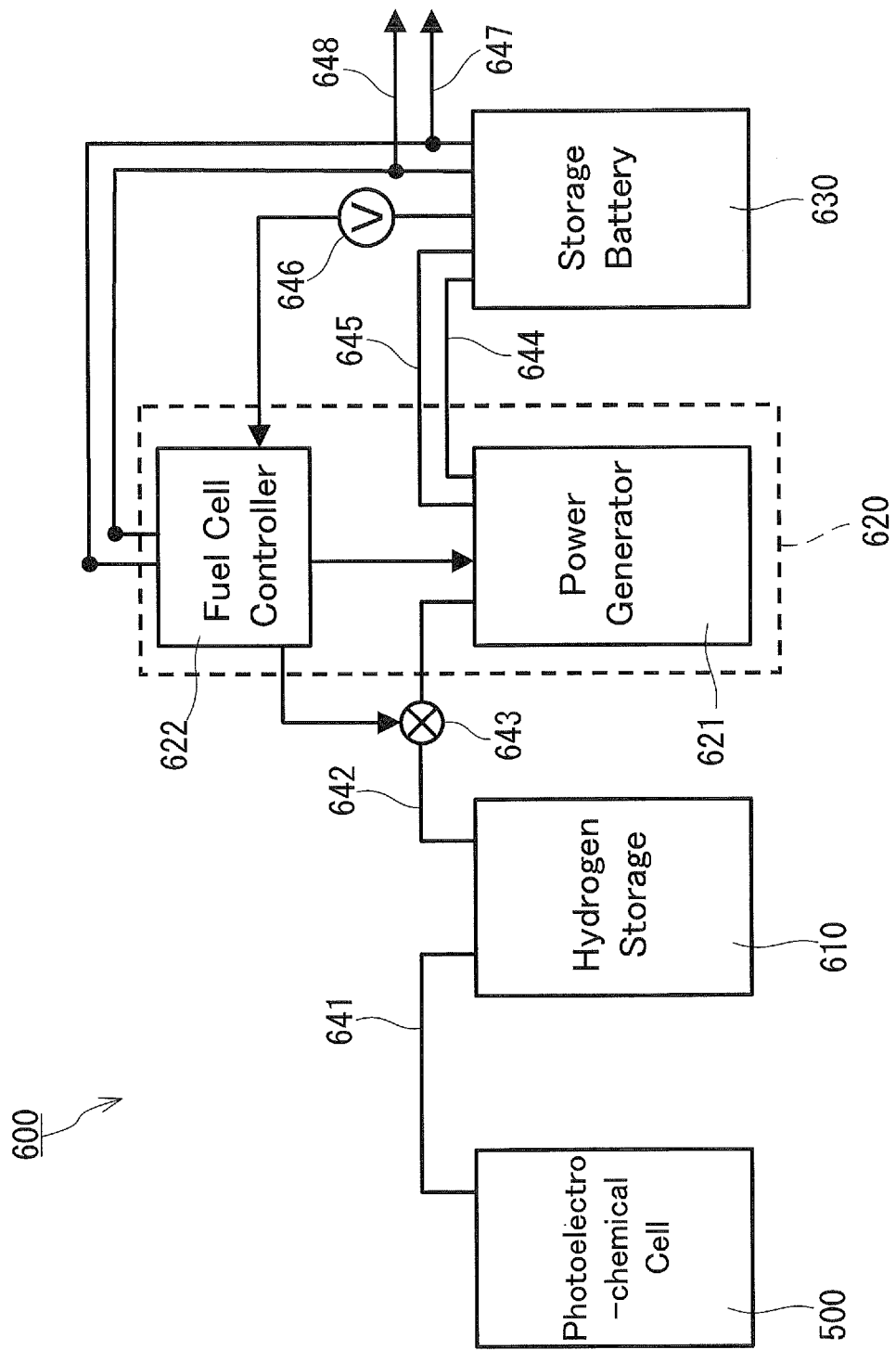
FIG. 11 is a schematic view illustrating the configuration of an energy system according to Embodiment 6 of the present invention.

The configuration of an energy system according to Embodiment 6 of the present invention is described with reference to FIG. 11. FIG. 11 is a schematic view illustrating the configuration of the energy system of the present embodiment.

As shown in FIG. 11, an energy system 600 of the present embodiment includes the photoelectrochemical cell 500, a hydrogen storage 610, a fuel cell 620 and a storage battery 630.

The photoelectrochemical cell 500 is the photoelectrochemical cell described in Embodiment 5 and the specific configuration thereof is as shown in FIG. 10. Therefore, detailed descriptions thereof are omitted.

The hydrogen storage 610 is connected to the second chamber 580 (see FIG. 10) of the photoelectrochemical cell 500 by a first pipe 641. The hydrogen storage 610 can be constituted, for example, by a compressor for compressing the hydrogen generated in the photoelectrochemical cell 500 and a high-pressure hydrogen tank for storing the hydrogen compressed by the compressor.

The fuel cell 620 includes a power generator 621, and a fuel cell controller 622 for controlling the power generator 621. The fuel cell 620 is connected to the hydrogen storage 610 by a second pipe 642. The second pipe 642 is provided with a block valve 643. For example, a fuel cell of the polymeric solid electrolyte type can be used as the fuel cell 620.

The positive electrode and the negative electrode of the storage battery 630, respectively, are connected electrically to the positive electrode and the negative electrode of the power generator 621 in the fuel cell 620 by a first line 644 and a second line 645. The storage battery 630 is provided with a capacity counter 646 for counting the remaining capacity of the storage battery 630. A lithium ion battery, for example, can be used as the storage battery 630.

Next, the operation of the energy system 600 of the present embodiment is described with reference to FIG. 10 and FIG. 11.

When the surface of the second n-type semiconductor layer 523 of the semiconductor electrode 520 disposed inside the first chamber 570 is irradiated with sunlight through the light incident portion 510a of the photoelectrochemical cell 500, electrons and holes occur inside the second n-type semiconductor layer 523. The holes generated at this time transfer toward the surface side of the second n-type semiconductor layer 523. Thereby, water is decomposed on the surface of the second n-type semiconductor layer 523 according to the above reaction formula (1), so that oxygen is generated.

On the other hand, the electrons transfer to the conductor 521 along the bending of the band edge of the conduction band at the interface between the second n-type semiconductor layer 523 and the first n-type semiconductor layer 522 and at the interface between the first n-type semiconductor layer 522 and the conductor 521. The electrons that have transferred to the conductor 521 transfer toward the side of the counter electrode 530 connected electrically to the conductor 521 through the conducting wire 550. Thereby, hydrogen is generated on the surface of the counter electrode 530 according to the above reaction formula (2).

At this time, since no Schottky barriers occur at the junction plane between the second n-type semiconductor layer 523 and the first n-type semiconductor layer 522, the electrons can transfer from the second n-type semiconductor layer 523 to the first n-type semiconductor layer 522 without being prevented, as in the semiconductor electrode 120 in Embodiment 1. Furthermore, since no Schottky barriers occur also at the junction plane between the first n-type semiconductor layer 522 and the conductor 521, the electrons can transfer to the conductor 521 without being prevented. Accordingly, the probability of the recombination between the electrons and holes generated by photoexcitation inside the first n-type semiconductor layer 523 is reduced, and the quantum efficiency of the hydrogen evolution reaction by irradiation with light can be improved.

Oxygen generated inside the first chamber 570 is discharged from the first gas outlet 571 to the outside of the photoelectrochemical cell 500. On the other hand, hydrogen generated inside the second chamber 580 is supplied into the hydrogen storage 610 through the second gas outlet 581 and the first pipe 641.

In generating power in the fuel cell 620, the block valve 643 is opened according to signals from the fuel cell controller 622, so that the hydrogen stored inside the hydrogen storage 610 is supplied to the power generator 621 of the fuel cell 620 through the second pipe 642.

The electricity generated in the power generator 621 of the fuel cell 620 is stored inside the storage battery 630 through the first line 644 and the second line 645. The electricity stored inside the storage battery 630 is supplied to households, enterprises and the like through a third line 647 and a fourth line 648.

According to the photoelectrochemical cell 500 in the present embodiment, it is possible to improve the quantum efficiency of the hydrogen evolution reaction by irradiation with light. Thus, the energy system 600 of the present embodiment including the photoelectrochemical cell 500 can provide an efficient power supply.

Although the energy system using the photoelectrochemical cell 500 described in Embodiment 5 is exemplified in the present embodiment, the same effects can be obtained also when the photoelectrochemical cells 100, 200, 300 and 400 described in Embodiments 1 to 4, respectively, are used.

EXAMPLES

Hereinafter, examples of the present invention are described in detail.

Reference Examples

First, reference examples are described to see effect difference between a semiconductor electrode (Reference Example 1-1) in which the relationship between the band edge levels of the conduction band and the valence band in the first n-type semiconductor layer and the band edge levels of the conduction band and the valence band in the second n-type semiconductor layer satisfies that in the present invention and the relationship among the Fermi level of the first n-type semiconductor layer, the Fermi level of the second n-type semiconductor layer and the Fermi level of the conductor also satisfies that in the present invention, and a semiconductor electrode (Reference Example 1-2) in which these relationships do not satisfy those in the present invention. It should be noted, however, that since this is just to see the effects due to the band edge level relationship and the Fermi level relationship, the first n-type semiconductor layer was formed as one film without the nanotube array structure.

As Reference Example 1-1, a photoelectrochemical cell having the same configuration as that of the photoelectrochemical cell 300 shown in FIG. 8 was produced. Hereinafter, the photoelectrochemical cell of Reference Example 1-1 is described with reference to FIG. 8.

The photoelectrochemical cell 300 of Reference Example 1-1 included the rectangular glass container (container 110) with an opening in the upper part, the semiconductor electrode 320 and the counter electrode 130. The glass container 110 accommodated an aqueous solution containing 0.01 mol/L of sodium sulfide and 0.01 mol/L of sodium sulfite.

The semiconductor electrode 320 was produced according to the following procedure.

First, a 150 nm-thick ITO film (sheet resistance 10 Ω/sq) was formed, as the conductor 321, on a 1 cm-square glass substrate as the insulation layer 324 by sputtering. Subsequently, a 500 nm-thick titanium oxide film (anatase polycrystalline material) was formed, as the first n-type semiconductor layer 322, on the conductor 321 by sputtering. Finally, a 1 μm-thick cadmium sulfide film was formed, as the second n-type semiconductor layer 323, on the first n-type semiconductor layer 322 by chemical precipitation using cadmium acetate and thiourea. The semiconductor electrode 320 was disposed so that the surface of the second n-type semiconductor layer 323 faces the light incident surface 110a of the glass container 110.

A platinum plate was used as the counter electrode 130. A portion of the conductor 321 of the semiconductor electrode 320 was connected electrically to the counter electrode 130 by the conducting wire 150. The current flowing between the semiconductor electrode 320 and the counter electrode 130 was measured with an ammeter.

An irradiation experiment with simulated sunlight was conducted on the thus produced photoelectrochemical cell 300 of Reference Example 1-1. In the irradiation experiment with simulated sunlight, the surface of the second n-type semiconductor layer 322 in the semiconductor electrode 320 of the photoelectrochemical cell 300 was irradiated with light at an intensity of 1 kW/m² through the light incident portion 110a using a solar simulator manufactured by SERIC LTD. as the simulated sunlight. The gas generated on the surface of the counter electrode 130 was collected for 30 minutes, and the components were analyzed and the amount generated was determined for the collected gas by gas chromatography. Furthermore, the photocurrent flowing between the semiconductor electrode 320 and the counter electrode 130 was measured with the ammeter. The apparent quantum efficiency was calculated using the amount of gas generated on the counter electrode 130. The apparent quantum efficiency was calculated by the following formula.

Apparent quantum efficiency={(Photocurrent density measured [mA/cm²])/(Photocurrent density obtainable by the sunlight to be possibly absorbed in the band gap of the semiconductor material used for the second n-type semiconductor layer [mA/cm²])}×100

As a result of the analysis of the gas collected in the photoelectrochemical cell of Reference Example 1-1, it was confirmed that hydrogen was generated on the counter electrode. The rate of hydrogen generation was $2.3 \times 10^{-7}$ L/s. Furthermore, since the photocurrent flowing between the semiconductor electrode and the counter electrode was 1.8 mA/cm², it was confirmed that the electrical decomposition of water was performed quantitatively. The apparent quantum efficiency was about 28%, as calculated by the above-mentioned formula. Here, the calculation was performed, assuming that the photocurrent density obtainable by the sunlight to be possibly absorbed in the band gap (2.5 eV) of the semiconductor material (CdS) used for the second n-type semiconductor layer was 6.5 mA/cm². Table 1 shows the results. Table 1 below also indicates the Fermi levels $E_F$, the band edge levels $E_C$ of the conduction band and the band edge levels $E_V$ of the valence band in the first and second n-type semiconductor layers, and the Fermi level $E_F$ of the conductor. It should be noted that the values of the Fermi levels, the band edge levels of the conduction band, and the band edge levels of the valence band are indicated herein relative to the vacuum level, in the state where the semiconductor is in contact with an electrolyte at a pH of 0 and a temperature of 25° C. These values were cited from literature.

Next, Reference Example 1-2 to be compared with Reference Example 1-1 was produced.

A photoelectrochemical cell was produced as Reference Example 1-2 by the same procedure as that used for Reference Example 1-1, except that instead of the cadmium sulfide film, a 1 μm-thick strontium titanate film was provided, as the second n-type semiconductor layer, on the first n-type semiconductor layer in the semiconductor electrode.

The irradiation experiment with simulated sunlight was conducted on the thus produced photoelectrochemical cell of Reference Example 1-2, in the same manner as in Reference Example 1-1. The photoelectrochemical cell of Reference Example 1-2 was irradiated with light. As a result, it was recognized that gas was generated on the surface of the counter electrode, but the generation amount was too small to be detected. Thus, the quantum efficiency could not be calculated. Table 1 below also shows the Fermi levels, the band edge levels of the conduction band and the band edge levels of the valence band in the first and second n-type semiconductor layers, and the Fermi level of the conductor, in the same manner as Reference Example 1-1.

TABLE 1

|  |  | Second n-type semiconductor layer | First n-type semiconductor layer | Conductor | Quantum efficiency (%) |
| --- | --- | --- | --- | --- | --- |
| Reference Example | Material composition | CdS | TiO₂ | ITO | 28 |

TABLE 1-continued

|  |  | Second n-type semiconductor layer | First n-type semiconductor layer | Conductor | Quantum efficiency (%) |
|---|---|---|---|---|---|
| 1-1 | Fermi level | −5.24 eV | −4.34 eV | −4.24 eV |  |
|  | Conduction band | −4.04 eV | −4.24 eV | — |  |
|  | Valence band | −6.54 eV | −7.44 eV | — |  |
| Reference Example 1-2 | Material composition | SrTiO$_3$ | TiO$_2$ | ITO | — |
|  | Fermi level | −4.24 eV | −4.34 eV | −4.24 eV |  |
|  | Conduction band | −4.14 eV | −4.24 eV | — |  |
|  | Valence band | −7.34 eV | −7.44 eV | — |  |

In the semiconductor electrode in Reference Example 1-1, the band edge level of the conduction band and the band edge level of the valence band in the second n-type semiconductor layer, respectively, were higher than the band edge level of the conduction band and the band edge level of the valence band in the first n-type semiconductor layer. Furthermore, the Fermi levels of the conductor, the first n-type semiconductor layer and the second n-type semiconductor layer increased in the order of the second n-type semiconductor layer, the first n-type semiconductor layer and the conductor. In the semiconductor electrode in Reference Example 1-1, efficient charge separation between the electrons and holes generated by photoexcitation inside the second n-type semiconductor layer lowered the probability of the recombination between the generated electrons and holes. As a result, in Reference Example 1-1, a larger amount of gas was generated than in Reference Example 1-2 and a relatively high apparent quantum efficiency was achieved.

In contrast, in the semiconductor electrode in Reference Example 1-2, the Fermi level of the first n-type semiconductor layer was lower than the Fermi level of the second n-type semiconductor layer, as shown in Table 1. In view of this, it is conceived that since Schottky barriers occurred at the junction plane between the first n-type semiconductor layer and the second n-type semiconductor layer, the charge separation between the electrons and holes generated by photoexcitation inside the second n-type semiconductor layer was not achieved and the probability of the recombination between the generated electrons and holes was increased, reducing significantly the amount of gas generated.

A sodium sulfite aqueous solution containing sodium sulfide was used as the electrolyte in the photoelectrochemical cells of Reference Examples. In view of this, it is conceived that when the semiconductor electrode was irradiated with light, the reaction that proceeded in the semiconductor electrode was not an oxygen evolution reaction according to the above-indicated reaction formula (1) but a reaction according to the below-indicated reaction formula (3). Further, it is conceived that the reaction expressed by the aforementioned reaction formula (2) proceeded in the counter electrode.

$$2h^+ + S^{2-} \to S \qquad (3)$$

Example

As an example of the photoelectrochemical cell according to the present invention, a photoelectrochemical cell having the same configuration as that of the photoelectrochemical cell 100 shown in FIG. 1 was produced. Hereinafter, the photoelectrochemical cell of the present example is described with reference to FIG. 1.

The photoelectrochemical cell 100 of the present example included the rectangular glass container (container 110) with an opening in the upper part, the semiconductor electrode 120 and the counter electrode 130. The glass container 110 accommodated an aqueous solution, as the electrolyte 140, prepared so as to contain 0.01 mol/L of sodium sulfide and 0.01 mol/L of sodium sulfite and have a total amount of 200 mL. Here, the purpose of using the mixed solution of sodium sulfide and sodium sulfite as the electrolyte is to prevent the cadmium sulfide used as the second n-type semiconductor layer 123 from eluting due to irradiation with light in water.

The semiconductor electrode 120 was produced according to the following procedure.

A 10 mm×30 mm titanium metal plate acid-cleaned beforehand was immersed in an electrolyte composed of 100 g of ethylene glycol, 2 g of water and 0.3 g of ammonium fluoride and used as an anode. A platinum wire was used as a cathode. Anodic oxidation was performed at an applied voltage of 60 V for 3 minutes. The interelectrode distance between the anode and the cathode was fixed to 30 mm and the electrolyte was ice-bathed so as to keep the temperature of the electrolyte at about 5° C. during the reaction. Thereby, a titanium oxide nanotube array composed of tubes having a length of 500 to 600 nm, an outer diameter of 150 nm and an inner diameter of 50 nm was produced. Subsequently, this titanium oxide nanotube array was sintered at 500° C. for 4 hours to increase its crystallinity. It was confirmed, by XRD (X-ray diffraction), that this sintering renders the titanium oxide nanotube array into an anatase crystalline material. By such a method, the titanium oxide nanotube array was produced, as the first n-type semiconductor layer 122, on the conductor 121 composed of titanium metal.

As the second n-type semiconductor layer 123, cadmium sulfide was deposited, by chemical deposition, on the thus produced conductor 121 that was composed of titanium metal and had the titanium oxide nanotube array on its surface. Specifically, a solution was prepared by mixing cadmium acetate, ammonia, ammonium acetate and thiourea so as to be at a concentration of 0.001 mol/L, 0.4 mol/L, 0.01 mol/L and 0.005 mol/L, respectively, and have a total amount of 500 mL. This solution was hot-water-bathed at 80° C., and the titanium metal plate provided with the titanium oxide nanotube array was immersed in the solution for 15 minutes. Thereby, a cadmium sulfide film to serve as the second n-type semiconductor layer 123 was formed in a thickness of 500 nm.

A platinum electrode was used as the counter electrode 130. The conductor 121 of the semiconductor electrode 120 was connected electrically to the counter electrode 130 by the conducting wire 150.

Figure 12:
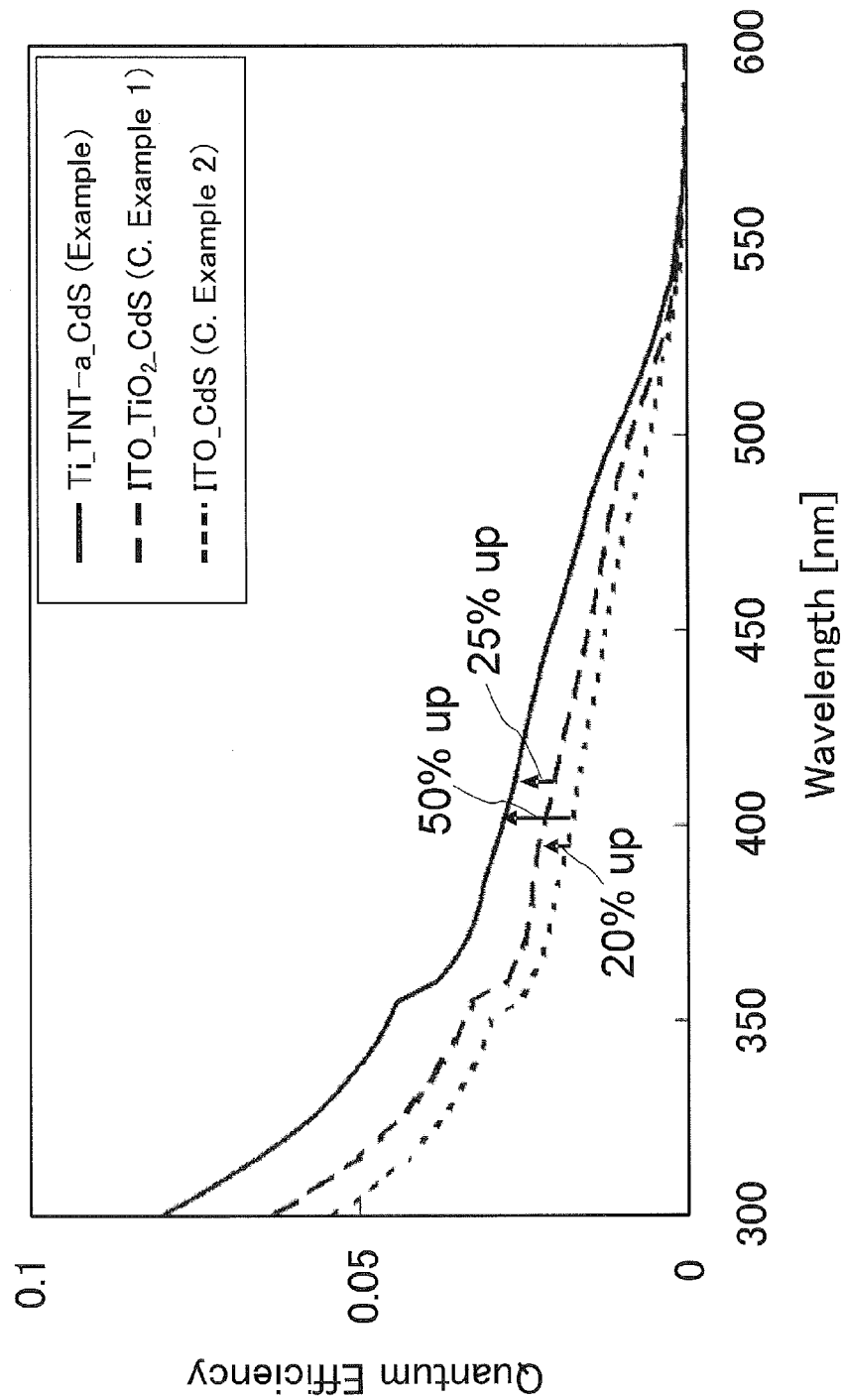
FIG. 12 is a graph showing quantum efficiencies of the photoelectrochemical cells according to Example and Comparative Examples of the present invention.

The photoelectrochemical cell 100 of the present example thus produced was measured for quantum efficiency with respect to light having a wavelength of 300 nm to 600 nm. FIG. 12 shows the result thereof. The method of measuring the quantum efficiency was as follows.

Monochromatic light obtained by spectral separation of Xe lamp light by a spectrometer, a monochromator, was measured for light quantity beforehand with a Si photodiode. Then, the photoelectrochemical cell 100 was irradiated with the monochromatic light, and the value of current generated in irradiation at each wavelength was detected. Using these measurement results, the quantum efficiency was calculated as follows. Quantum efficiency=(Value of current generated in irradiation at each wavelength)/(Number of photons at each wavelength)

A sodium sulfite aqueous solution containing sodium sulfide was used as the electrolyte in the photoelectrochemical cell of present example. In view of this, it is conceived that when the semiconductor electrode was irradiated with light, the reaction that proceeded in the semiconductor electrode was not an oxygen evolution reaction according to the above-mentioned reaction formula (1) but a reaction according to the above-mentioned reaction formula (3). Further, it is conceived that the reaction expressed by the aforementioned reaction formula (2) proceeded in the counter electrode.

Comparative Example 1

As Comparative Example 1, a photoelectrochemical cell in which only the configuration of the semiconductor electrode was different from that in Example was produced. A 150 nm-thick titanium oxide film (anatase polycrystalline material) was formed on a 10 mm×50 mm ITO substrate (with a thickness of 150 nm) by sputtering, and a 500 nm-thick cadmium sulfide film further was formed thereon in the same manner as in Example. By this method, the semiconductor electrode of Comparative Example 1 was produced in which the titanium oxide film was disposed, as the first n-type semiconductor layer, on the conductor composed of ITO, and the cadmium sulfide film further was disposed thereon as the second n-type semiconductor layer. That is, in Comparative Example 1, the semiconductor electrode had a configuration in which the first n-type semiconductor layer did not have the nanotube array structure.

The photoelectrochemical cell of Comparative Example 1 thus produced was measured for quantum efficiency with respect to light having a wavelength of 300 nm to 600 nm, by the same method as in Example. FIG. 12 shows the result thereof.

Comparative Example 2

As Comparative Example 2, a photoelectrochemical cell in which only the configuration of the semiconductor electrode was different from that in Example was produced. A 500 nm-thick cadmium sulfide film was formed on a 10 mm×50 mm ITO substrate (with a thickness of 150 nm) by chemical deposition. By this method, the semiconductor electrode was produced in which the cadmium sulfide film was disposed directly on the conductor composed of ITO. That is, the semiconductor electrode of Comparative Example 2 had a configuration in which the first n-type semiconductor layer having the nanotube array structure was omitted and only the second n-type semiconductor layer was disposed on the conductor.

The photoelectrochemical cell of Comparative Example 2 thus produced was measured for quantum efficiency with respect to light having a wavelength of 300 nm to 600 nm, by the same method as in Example. FIG. 12 shows the result thereof.

As shown in FIG. 12, in the photoelectrochemical cell of Example, the quantum efficiency started increasing at around 550 nm that is the absorption edge of cadmium sulfide. Throughout the wavelength range of 550 nm or less, the quantum efficiency was enhanced by about 50% from that in the case (Comparative Example 2) where the first n-type semiconductor layer was omitted, and by about 25% from that in the case (Comparative Example 1) where not the titanium oxide nanotubes but the smooth titanium oxide film was used for the first n-type semiconductor layer. Comparing Comparative Example 1 with Comparative Example 2, the quantum efficiency in Comparative Example 1 using the titanium oxide film was enhanced by about 20% from the quantum efficiency in Comparative Example 2. Conceivably, the quantum efficiency was enhanced in Example because in the semiconductor electrode of Example, the titanium oxide nanotubes were used as the first n-type semiconductor layer and thereby the first n-type semiconductor layer had a large surface area as well as high crystallinity. Although the titanium oxide nanotube array was used in Example as the first n-type semiconductor layer having the nanotube structure, the material of the nanotube array is not limited to titanium oxide. Moreover, although cadmium sulfide was used for the second n-type semiconductor layer, the material of the second n-type semiconductor layer is not limited to cadmium sulfide, and a semiconductor, such as TaON and $Ta_3N_5$, also may be used.

Industrial Applicability

The photoelectrochemical cell and the energy system according to the present invention can improve the quantum efficiency of the hydrogen evolution reaction by irradiation with light, and thus are useful as a domestic power generation system and the like.

The invention claimed is:

1. A photoelectrochemical cell comprising:
    a semiconductor electrode including a conductor, a first n-type semiconductor layer that is disposed on the conductor and has a nanotube array structure, and a second n-type semiconductor layer disposed on the first n-type semiconductor layer;
    a counter electrode connected electrically to the conductor;
    an electrolyte in contact with surfaces of the second n-type semiconductor layer and the counter electrode; and
    a container accommodating the semiconductor electrode, the counter electrode and the electrolyte, wherein:
    in the semiconductor electrode, relative to a vacuum level,
    (I) band edge levels of a conduction band and a valence band in the second n-type semiconductor layer, respectively, are higher than band edge levels of a conduction band and a valence band in the first n-type semiconductor layer,
    (II) a Fermi level of the first n-type semiconductor layer is higher than a Fermi level of the second n-type semiconductor layer, and
    (III) a Fermi level of the conductor is higher than the Fermi level of the first n-type semiconductor layer; and
    the photoelectrochemical cell generates hydrogen by irradiation of the second n-type semiconductor layer with light.

2. The photoelectrochemical cell according to claim 1, wherein
in the case of the electrolyte at a pH of 0 and a temperature of 25° C.,
the Fermi level of the first n-type semiconductor layer is −4.44 eV or more and the band edge level of the valence band in the second n-type semiconductor layer is −5.67 eV or less, relative to the vacuum level.

3. The photoelectrochemical cell according to claim 1, wherein the first n-type semiconductor layer is formed of a titanium oxide nanotube array.

4. The photoelectrochemical cell according to claim 1, wherein the second n-type semiconductor layer is composed of one selected from the group consisting of oxide, nitride and oxynitride.

5. The photoelectrochemical cell according to claim 1, wherein the counter electrode is disposed on the conductor.

6. An energy system comprising:
the photoelectrochemical cell according to claim 1;
a hydrogen storage that is connected to the photoelectrochemical cell by a first pipe and that stores hydrogen generated in the photoelectrochemical cell; and
a fuel cell that is connected to the hydrogen storage by a second pipe and that converts the hydrogen stored in the hydrogen storage into electricity.

7. A photoelectrochemical cell comprising:
a semiconductor electrode including a conductor, a first p-type semiconductor layer that is disposed on the conductor and has a nanotube array structure, and a second p-type semiconductor layer disposed on the first p-type semiconductor layer;
a counter electrode connected electrically to the conductor;
an electrolyte in contact with surfaces of the second p-type semiconductor layer and the counter electrode; and
a container accommodating the semiconductor electrode, the counter electrode and the electrolyte, wherein:
in the semiconductor electrode, relative to a vacuum level,
(I) band edge levels of a conduction band and a valence band in the second p-type semiconductor layer, respectively, are lower than band edge levels of a conduction band and a valence band in the first p-type semiconductor layer,
(II) a Fermi level of the first p-type semiconductor layer is lower than a Fermi level of the second p-type semiconductor layer, and
(III) a Fermi level of the conductor is lower than the Fermi level of the first p-type semiconductor layer; and
the photoelectrochemical cell generates hydrogen by irradiation of the second p-type semiconductor layer with light.

8. The photoelectrochemical cell according to claim 7, wherein
in the case of the electrolyte at a pH of 0 and a temperature of 25° C.,
the Fermi level of the first p-type semiconductor layer is −5.67 eV or less and the band edge level of the conduction band in the second p-type semiconductor layer is −4.44 eV or more, relative to the vacuum level.

9. The photoelectrochemical cell according to claim 7, wherein the second p-type semiconductor layer is composed of one selected from the group consisting of oxide, nitride and oxynitride.

10. The photoelectrochemical cell according to claim 7, wherein the counter electrode is disposed on the conductor.

11. An energy system comprising:
the photoelectrochemical cell according to claim 7;
a hydrogen storage that is connected to the photoelectrochemical cell by a first pipe and that stores hydrogen generated in the photoelectrochemical cell; and
a fuel cell that is connected to the hydrogen storage by a second pipe and that converts the hydrogen stored in the hydrogen storage into electricity.

* * * * *